United States Patent
Schmitt et al.

(10) Patent No.: US 10,953,933 B2
(45) Date of Patent: Mar. 23, 2021

(54) ACTIVE WHEEL SPOILER

(71) Applicant: Röchling Automotive SE & Co. KG, Mannheim (DE)

(72) Inventors: Andreas Schmitt, Worms-Hernsheim (DE); Karsten Grebel, Bürstadt (DE); Juliane Nies, Bonn (DE); Peter Dill, Ingolstadt (DE); Virgil-Catalin Petrisor, Pitesti (RO); Patrick Urbach, Mainz (DE); Nagaraj Koppad, Worms (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 104 days.

(21) Appl. No.: 16/107,018

(22) Filed: Aug. 21, 2018

(65) Prior Publication Data

US 2019/0061839 A1 Feb. 28, 2019

(30) Foreign Application Priority Data

Aug. 23, 2017 (DE) ..................... 10 2017 214 769.5

(51) Int. Cl.
*B62D 35/00* (2006.01)
*B62D 37/02* (2006.01)
*B62D 35/02* (2006.01)

(52) U.S. Cl.
CPC ........... *B62D 35/005* (2013.01); *B62D 37/02* (2013.01); *B62D 35/02* (2013.01)

(58) Field of Classification Search
CPC ...... B62D 35/00; B62D 35/005; B62D 35/02; B62D 37/02

USPC ................................. 296/180.1, 180.3, 180.5
See application file for complete search history.

(56) References Cited

U.S. PATENT DOCUMENTS

| 4,659,130 | A | * | 4/1987 | Dimora ............... B62D 35/005 |
| | | | | 296/180.1 |
| 7,780,223 | B2 | | 8/2010 | Kottenstette et al. |
| 8,297,685 | B2 | | 10/2012 | Wolf et al. |

(Continued)

FOREIGN PATENT DOCUMENTS

| CN | 103556956 A | 2/2014 |
| CN | 104015624 A | 9/2014 |

(Continued)

OTHER PUBLICATIONS

German Search Report for corresponding DE10 2017 214 769.5 dated Jul. 18, 2018, 8 pgs.

(Continued)

*Primary Examiner* — Jason S Daniels

(74) *Attorney, Agent, or Firm* — Rankin Hill & Clark LLP; Gregory S. Vickers

(57) ABSTRACT

A wheel spoiler apparatus encompassing a flow impingement body, a displacement drive system, and a displacement guidance system, the flow impingement body being displaceable between a retracted inactive position and an extended active position, the displacement guidance system comprising a vehicle connection region in which it is connectable to a vehicle body, and comprising a flow impingement body connection region in which it is connected to the flow impingement body, the displacement guidance system encompasses two four-joint linkages coupled to one another via a common pivot joint.

13 Claims, 15 Drawing Sheets

(56) References Cited

U.S. PATENT DOCUMENTS

| | | | |
|---|---|---|---|
| 8,887,845 B2* | 11/2014 | McDonald | B62D 35/005 180/68.1 |
| 9,102,367 B1 | 8/2015 | Beierl et al. | |
| 10,081,400 B2* | 9/2018 | Abdoul Azizou | H02P 6/16 |
| 10,124,839 B2* | 11/2018 | Povinelli | B62D 35/005 |
| 2011/0049913 A1* | 3/2011 | Bernt | B60R 19/48 293/102 |
| 2013/0341110 A1* | 12/2013 | Butlin, Jr. | B62D 35/005 180/68.1 |

FOREIGN PATENT DOCUMENTS

| | | |
|---|---|---|
| CN | 204410234 U | 6/2015 |
| CN | 106931296 A | 7/2017 |
| DE | 102009057656 A1 | 7/2010 |
| DE | 102014208278 A1 | 11/2015 |
| EP | 1674381 B1 | 9/2007 |
| FR | 2858793 A1 | 2/2005 |
| FR | 2897038 A1 | 8/2007 |
| JP | 63103776 A * | 5/1988 |

OTHER PUBLICATIONS

Espacenet Bibliographic data:DE102009057656(A1), Published Jul. 29, 2010, 1pg.
Espacenet Bibliographic data:FR2858793(A1), Published Feb. 18, 2005, 1pg.
Espacenet Bibliographic data:FR2897038(A1), Published Aug. 10, 2007, 1pg.
Espacenet Bibliographic data:DE102014208278(A1), Published Nov. 5, 2015, 1pg.
Espacenet Bibliographic data:EP1674381(B1), Published Sep. 26, 2007, 1pg.
Espacenet Bibliographic data:CN104015624(A), Published Sep. 3, 2014, 2pgs.
Espacenet Bibliographic data:CN106931296(A), Published Jul. 7, 2017, 1pg.
Espacenet Bibliographic data:CN204410234(U), Published Jun. 24, 2015, 1pg.
Espacenet Bibliographic data:CN103556965(A), Published Feb. 5, 2014, 2pgs.
Chinese Office Action for corresponding CN 201810936054.7 dated Nov. 13, 2020, 13 pgs.

* cited by examiner

ACTIVE WHEEL SPOILER

The present Application relates to a wheel spoiler apparatus encompassing a flow impingement body, a displacement drive system, and a displacement guidance system, the flow impingement body being displaceable between a retracted inactive position and an extended active position, the displacement guidance system comprising a vehicle connection region in which it is connectable to a vehicle body, and comprising a flow impingement body connection region in which it is connected to the flow impingement body.

BACKGROUND OF THE INVENTION

Wheel spoiler apparatuses on vehicles are known, and are used thereon in order to advantageously influence flow conditions of air flow that impinges during driving operation in the region of the wheels, in particular the front wheels. A distinction is made between static, passive, and active wheel spoilers.

Static wheel spoiler apparatuses are connected in permanent and stationary fashion to the vehicle body. As a rule, they do not change their shape or location relative to the remainder of the vehicle body during driving operation. A static wheel spoiler apparatus is known, for example, from EP 1 674 381 B1.

Passive wheel spoiler apparatuses are those wheel spoiler apparatuses whose shape and/or relative location with respect to the remainder of the vehicle body is modifiable as a function of the particular vehicle operating mode that exists, in particular as a function of vehicle speed. Passive wheel spoiler apparatuses do not have any actuators, but instead are modified, in terms of their shape and/or location relative to the remainder of the vehicle body, by the forces that occur during driving operation, in particular wind loads. A passive wheel spoiler apparatus is known, for example, from DE 10 2010 036 442 A1.

The flow impingement body of active wheel spoiler apparatuses (which are the only ones discussed in the present Application) is displaced in actuator-based fashion, between a retracted inactive position and an extended active position, by a displacement drive system. This displacement movement is guided by a displacement guidance system. The flow impingement body projects more greatly into the wind blast in the active position than in the inactive position. Preferably, in the inactive position the flow impingement body is retracted completely out of the wind blast of the vehicle carrying the wheel spoiler apparatus, and no flow impinges upon it.

Active wheel spoiler apparatuses are advantageous because the flow impingement body can be retracted into the vehicle body at low driving speeds at which optimization of the flow conditions around the vehicle wheel located behind the flow impingement body in an impingement flow direction is not so important, with the result that at low driving speeds, the vehicle's ground clearance in the region in front of its wheels is not decreased by the flow impingement body or bodies. In regions, for example built-up areas, with low driving speeds but a high occurrence of obstacles close to the ground, for example curbs and speed bumps, the risk of collision with the active wheel spoiler apparatus can thereby be minimized. Where driving occurs at higher speeds and where few or no ground obstacles are accordingly present, the flow impingement body can be displaced into the active position and the flow of wind blast around wheels of the vehicle can be positively influenced down toward lower flow resistance values. The flow resistance of an object increases as the square of the speed of the air flow impinging upon it.

An active wheel spoiler apparatus of the kind recited initially is known, for example, from FR 2 897 038 A1. This document discloses a shell-shaped flow impingement body having a U-shaped cross section whose base limb comprises a flow impingement surface, facing oppositely to the flow impingement direction, upon which the flow of wind blast impinges during driving operation. A respective further limb stands out from the base limb on both sides in a flow impingement direction. In order to improve flow conditions, the known flow impingement body can be pivoted, concentrically with the front wheel associated with it, out of an inactive position concealed in the wheel well toward a roadway surface on which the vehicle carrying the wheel spoiler apparatus is standing, and into an active position in the impinging wind blast. The known flow impingement body can be pivoted back in the opposite direction, concentrically with the front wheel associated with it, back into the wheel well.

A further active wheel spoiler apparatus is known from DE 10 2009 057 656 A1.

SUMMARY OF THE INVENTION

An object of the present invention is to further improve active wheel spoiler apparatuses of the species which are known from the existing art.

According to a first aspect of the present Application, a long quasi-linear displacement travel is obtained in reliable, robust, and low-maintenance fashion on a wheel spoiler apparatus of the kind recited initially by the fact that the displacement guidance system encompasses two four-joint linkages coupled to one another via a common pivot joint. By being coupled to one another, the two four-joint linkages can ensure a linear or quasi-linear movement, over a wide region of its movement range, of the flow impingement body connected to the flow impingement body connection region. The displacement travel can be adjusted by way of the link length of the links used in the respective four-joint linkages.

The flow impingement body can thus be guided linearly or almost linearly to move between the inactive position and active position, with no need to use for that purpose an expensive linear guidance system that is either dirt-sensitive or difficult to encapsulate.

When a hollow flow impingement body is advantageously used, the displacement guidance system encompassing the coupled four-joint linkages can be surrounded by the flow impingement body at least in portions, i.e. in particular its portion proceeding from the flow impingement body connection region, so that the displacement guidance system can be protected from dirt and external forces solely by the flow impingement body that is to be provided in any case, without further measures.

The wheel spoiler apparatus can comprise a frame that is vehicle-mounted in the operationally ready state. This frame can be a part of the vehicle that carries the wheel spoiler apparatus in the fully installed state, for example a vehicle underbody and/or a vehicle wheel well liner.

The frame preferably surrounds the flow impingement body, at least in its inactive position, over more than half its circumference, preferably along a continuous circumferential path, so that the flow impingement body in the inactive position is additionally protected by the frame. When a part of the frame surrounding the flow impingement body is embodied as a skirt that at least partly, preferably entirely, surrounds the flow impingement body, that skirt can furthermore additionally guide the flow impingement body upon displacement between the active position and inactive position, and thereby relieve the coupled four-joint linkages of transverse forces and bending moments that can occur as a result of wind blast striking the flow impingement body in a flow impingement direction.

The aforementioned skirt of the frame, which extends along a portion of the displacement path traversed by the flow impingement body upon its displacement between the active position and inactive position, preferably surrounds the flow impingement body with a small radial gap dimension of preferably less than 5 mm, in particular less than 3 mm. The movement clearance of the flow impingement body orthogonally to the displacement path can thereby be minimized.

The aforementioned vehicle connection region of the displacement guidance system can be embodied directly on the displacement guidance system or on the frame. In the latter case the displacement guidance system comprises the vehicle connection region indirectly through the intermediary of the frame.

In physical terms, linear movement guidance by way of coupled four-joint linkages can be implemented by the fact that a first four-joint linkage is a flow impingement body-side four-joint linkage having two body-side links that are respectively articulated on the flow impingement body at their one longitudinal ends constituting base longitudinal ends, a second four-joint linkage being a vehicle-side four-joint linkage having two vehicle-side links that are articulatable indirectly or directly on the vehicle respectively at their longitudinal ends, constituting base longitudinal ends, facing toward the vehicle during operation, the body-side links being respectively articulated on a vehicle-side link at their coupler longitudinal ends opposite from the base longitudinal ends, and the vehicle-side links being respectively articulated on a body-side link at their coupler longitudinal ends opposite from the base longitudinal ends.

In very general terms, a four-joint linkage in its fundamental form encompasses a base on which two links are articulated around respective mutually parallel base-side pivot axes, and a coupler that is articulated on each one of the two links, again around two coupler pivot axes that are parallel to one another and to the base pivot axes. The base is usually vehicle body-mounted, if a "vehicle body" is an appropriate term given the rest of the design.

In the present preferred instance of the displacement guidance system, the flow impingement body or a component connected fixedly to it constitutes a base of the first four-joint linkage, and the vehicle connection region constitutes the base of the second four-joint linkage. The vehicle connection region can be constituted by the frame of the wheel spoiler apparatus, or by a base component that is embodied, because of its design, for connection to a vehicle carrying the wheel spoiler apparatus. Such a base component can comprise, for example, retaining configurations such as passthrough openings or undercut configurations and the like in order to fasten the base component, with participation of those retaining configurations, onto a vehicle, for example once again indirectly with interposition of the aforementioned frame.

It has proven to be both kinematically and dynamically advantageous if the two body-side links are each articulated at their coupler longitudinal ends on the same vehicle-side link. The same vehicle-side link on which both body-side links are articulated, and which thus constitutes a coupler of the body-side links, is preferably that vehicle-side link which is located farther from the articulation points of the base longitudinal ends of the body-side links.

It is also kinematically and dynamically advantageous if the two vehicle-side links are each articulated at their coupler longitudinal ends on the same body-side link. Once again, the same body-side link on which both vehicle-side links are articulated, and which thus constitutes a coupler of the vehicle-side links, is preferably that body-side link which is located farther from the articulation points of the base longitudinal ends of the vehicle-side links.

As has already been indicated above, the flow impingement body can protect the displacement guidance system constituted when two coupled four-joint linkages are used from external influences, at least in the flow impingement body connection region and in the region located close to it, if the flow impingement body is embodied correspondingly, for example as a shell-shaped flow impingement body or as a hollow flow impingement body, depending on whether or not a rear wall is provided on the flow impingement body on its rear side opposite from the flow impingement side in the flow impingement direction. What can be achieved as a result is that the articulation points of the base longitudinal ends of the body-side links are shielded by the flow impingement body regardless of the operating position in a direction along the displacement path that the flow impingement body traverses upon its displacement between the inactive position and active position, and orthogonally to the displacement path. In the inactive position, the base longitudinal ends of the body-side links and of the vehicle-side links are located closer together than in the active position, and for that reason, when the flow impingement body is in the inactive position the coupler longitudinal ends of both the body-side and vehicle-side links can be shielded by the flow impingement body in a direction along the displacement path and orthogonally to the displacement path.

With a correspondingly cup-like or hollow body-like embodiment of the flow impingement body, the aforesaid longitudinal ends of the links involved in constituting the displacement guidance system can also be shielded on the rear side parallel to the flow impingement direction.

The flow impingement body preferably comprises an end surface that forms a bottom of the flow impingement body and, in the operationally ready state, faces toward the roadway surface on which the vehicle carrying the wheel spoiler apparatus is standing. This bottom (end surface) shields the aforesaid longitudinal ends of the links of the displacement apparatus along the displacement path, since the end surface of the flow impingement body as a rule points along the displacement path.

The flow impingement body preferably comprises an enveloping surface, extending along the displacement path, which at least partly, preferably completely, surrounds the displacement path. Shielding by the flow impingement body orthogonally to the displacement path is then effected by the enveloping surface of the flow impingement body, so that the displacement guidance system is protected, at least in its region shielded by the flow impingement body, with respect to influences occurring a flow impingement direction.

According to a second aspect that can be implemented alternatively or in addition to the aforesaid first aspect of the present Application, the wheel spoiler apparatus of the kind recited initially is also improved by the fact that one segment, from among a vehicle segment fixedly connected to the vehicle connection region and a flow impingement body segment fixedly connected to the flow impingement body connection region, comprises rolling bodies that are in rolling engagement with a guidance track arrangement embodied on the respective other segment from among the vehicle segment and flow impingement body segment. Be it noted, however, that in very general terms a plain bearing system or plain guide can be embodied, in addition or alternatively to the rolling bearing system or rolling guide, between the vehicle segment and flow impingement body segment.

Friction between the vehicle-mounted vehicle segment and the flow impingement body upon a displacement between the inactive position and active position can be decreased as a result of the rolling bodies arranged between a vehicle-mounted component and the flow impingement body. As has already been stated, the rolling-body guide can be provided in addition to the aforementioned coupled four-joint linkages on the displacement guidance system, or alternatively thereto.

Although each of the two possible alternative arrangements of the rolling bodies is entirely functional, it is preferred to provide the rolling bodies on the flow impingement body segment fixedly connected to the flow impingement body connection region, and to embody on the vehicle segment only the guidance track arrangement that is in rolling engagement with the rolling bodies. The rolling bodies are thus less accessible to dirt from the external environment of the vehicle carrying the wheel spoiler apparatus than if they were provided on the vehicle segment. This is significant principally, but not only, when the rolling bodies are (as is preferred) rollers that are supported rotatably around a respective roller axis on the respective segment that carries them. If the rollers, constituting rolling bodies, are supported rotatably on the flow impingement body segment, the rotary bearing of the rollers is less exposed to a risk of contamination than if they were provided on the vehicle segment.

It can be sufficient in principle if the guidance track arrangement provides guidance in only one guidance direction, i.e. along a running surface on which the rolling bearings rest. Specifically, liftoff of the rolling bodies off the running surface in a liftoff direction orthogonal to the extension direction of the running surface, and/or also lateral shifting orthogonally to a plane of a guidance track spanned by the extension direction of the running surface and the liftoff direction, can then be possible. The running surfaces can be configured in groove-like fashion in order to suppress movement of the rolling bodies orthogonally to the plane spanned by the extension direction of the running surface and the liftoff direction of the rolling bodies. The rolling bodies then have essentially only one degree of freedom, in a liftoff direction.

In a refinement of the present Application, simple zero-clearance guidance of the flow impingement body along the desired displacement path can be achieved by the fact that the guidance track arrangement comprises a plurality of guidance tracks, extending in parallel, whose running surfaces point in different directions. The running surfaces preferably extend in mutually opposite and/or mutually orthogonal directions, so that the running surfaces extend along a common displacement path but their respective liftoff directions, in which rolling bodies rolling on the respective running surface are liftable off the running surface, point in different directions. The rolling bodies rolling on different running surfaces can then inhibit one another in terms of lifting off from their running surface. The guidance track arrangement therefore preferably comprises three parallel running surfaces, each rotated with respect to one another pairwise approximately 120° around a common longitudinal extension axis. Greater freedom in terms of designing the flow impingement body and the frame that surrounds it exists when the guidance track arrangement comprises four running surfaces, each two of which point in opposite directions that are respectively orthogonal to the displacement path, thus forming pairs or groups of oppositely directed running surfaces having parallel liftoff directions. The liftoff directions of different pairs or groups of oppositely directed running surfaces then enclose a right angle between one another. The flow impingement body can thus be guided in completely zero-clearance fashion along the desired displacement path. When the wheel spoiler apparatus comprises the aforementioned frame that surrounds the flow impingement body, said frame comprises the vehicle connection region of the displacement guidance system and therefore preferably comprises the guidance track arrangement having the running surfaces.

In principle, in the wheel spoiler apparatus of the first aspect of the present Application one of the links of the coupled four-joint linkage can be coupled as a crank to an actuator, and can thus be part of the displacement drive system.

Preferably, however, the displacement drive system of a wheel spoiler apparatus discussed in the present Application encompasses a toggle lever mechanism, since the latter allows an actuator coupled to the toggle lever mechanism, for example a rotational drive system of a toggle lever of the toggle lever mechanism, to be operated only during the displacement movement, and allows it not to be operated or supplied with energy in the active position and/or in the inactive position. In terms of design this can be achieved in that the flow impingement body is in the active position when the toggle lever mechanism is in a position that is no more than 15°, preferably no more than 10°, away from one of its extreme positions. The extreme position is preferably its extended position. This is because when the toggle lever mechanism is close to one of its extreme positions, theoretically that position cannot be overridden, since theoretically a very large, or even infinite, force would be required for linear movement of the flow impingement body coupled to the toggle lever mechanism out of the extreme (folded-up or extended) position of the toggle lever mechanism.

An actuator for displacing the flow impingement body can also be used in energy-saving fashion if, additionally or alternatively, the flow impingement body is in the inactive position when the two toggle levers of the toggle lever mechanism are in or close to the respective other extreme position, preferably enclose between one another at the toggle joint an angle of no more than 15°, particularly preferably no more than 10°. Taking into consideration unavoidable friction, the flow impingement body once again cannot displace itself unassistedly into the active position when the toggle lever mechanism is almost completely, or preferably completely, folded up.

In addition or alternatively to a linear displaceability of the flow impingement body between the inactive position and active position, the flow impingement body can be received between the inactive position and active position, rotatably around a displacement axis, on a frame or on a component connected movably to the frame. In order to achieve the greatest possible change in the position of the flow impingement body relative to the wheel associated with it as a result of its pivoting displacement, the flow impingement can comprise a pivot bearing configuration at its end region that is toward the front in the operationally ready state. This configuration can be embodied, for example, for positively engaging transfer of torque from a drive system, in particular from the aforementioned toggle lever mechanism.

In the context of advantageous influencing of the air flow around the wheel associated with it, the flow impingement body is particularly effectively protected from collisions with obstacles close to the ground, for example in city traffic, if, in the operationally ready installed state, it is farther, when in the inactive position, from the roadway surface on which the vehicle carrying the wheel spoiler apparatus is standing than when in the active position. Provision is made in principle that a vehicle carrying the wheel spoiler apparatus has, in the region in which the flow impingement body is arranged, less ground clearance when the flow impingement body is in the active position than when it is in the inactive position.

The articulated connection between two components connected relative to one another rotatably around a pivot axis, for example two links of the aforementioned four-joint linkages, or one such link and the flow impingement body connection region or the vehicle connection region, or between toggle levers of the toggle lever mechanism, can be simply and reliably retained against being axially pulled out—with reference to the pivot axis at the articulation point of the two components pivotably connected to one another—by the fact that of two components connected to one another pivotably relative to one another around a pivot axis, one comprises a retaining configuration and the respective other one a counterpart retaining configuration, the retaining configuration and the counterpart retaining configuration being in mutual positive engagement in a first relative pivot angle region of the components and thereby retaining the two components against axial movement away from one another with reference to the pivot axis, and not being in mutual positive engagement in a second relative pivot angle region different from the first. Simple cylindrical or even conical projections can thus be used on one of the two components as a rotation shaft for the respective other component with no need to provide, on the shaft itself, an axial pull-off retaining system that prevents axial separation of the two pivotable components.

The first relative pivot angle region is preferably the pivot angle region that is traversed by the two components during operation as intended. The second relative pivot angle region is preferably an installation pivot angle region that is reached only seldom, or not at all, during operation as intended. Preferably the second relative pivot angle region is substantially smaller than the first relative pivot angle region. For installation, the two components are then arranged relative to one another in the second relative pivot angle region and moved axially toward one another until they have axially approached one another sufficiently that the components are guided with respect to one another with sufficient accuracy for pivoting movement. After this approach, the relative pivot position of the two components is transferred from the second relative pivot angle region into the first relative pivot angle region, so that axial separation of the two components is prevented by the positive engagement of the retaining configuration and counterpart retaining configuration which is then established.

In terms of design, the counterpart retaining configuration can be a projection which is radial with reference to the pivot axis and around which the retaining configuration fits in the first relative pivot angle region; or it can be an abutment surface behind which a radial projection of the retaining configuration engages in the first relative pivot angle region. The abutment surface can comprise a passthrough opening through which the projection can be inserted only when the two components are in the second relative pivot angle region.

The flow impingement body is subjected to a variety of loading and stability requirements during operation of the wheel spoiler apparatus as intended. On the one hand it is exposed to considerable mechanical and fluid-dynamic influences on its flow impingement surface against which, in the active position, wind blast impinges during operation as intended. This relates not only to the impinging wind blast but also to impacting solid objects, for example stones, larger dirt particles, water droplets, flows of liquid, and the like, which can strike the flow impingement body. It is advantageous here to equip the flow impingement body with as much internal damping as possible, so that impact- or shock-related effects occurring on the flow impingement surface during operation are transferred as little as possible to the displacement guidance system and/or to the displacement drive system.

On the other hand, it is advantageous in terms of maximally exact movement guidance of the flow impingement body to configure parts of the displacement guidance system and/or of the displacement drive system as inflexibly and dimensionally stably as possible.

According to a third aspect of the present Application that can be implemented in addition or alternatively to the aforementioned first and/or aforementioned second aspect, a wheel spoiler apparatus of the kind recited initially can be further improved by the fact the flow impingement body is constituted from at least two different materials that differ in terms of their modulus of elasticity and/or their hardness.

For the reasons recited, it is preferred that at least one flow impingement surface of the flow impingement body, which surface in the active position is exposed as intended to the impingement of wind blast, be constituted from a material having a lower modulus of elasticity and/or less hardness; and that at least one connecting configuration that is embodied for indirect connection to a vehicle body be constituted from a material having a higher modulus of elasticity and/or greater hardness.

The flow impingement body can be manufactured, for example, using a two-component injection molding method, the flow impingement surface being constituted from a material having a lower modulus of elasticity and/or less hardness, and at least one connecting configuration being embodied from a material having a higher modulus of elasticity and/or greater hardness. A connecting configuration embodied for indirect connection to the vehicle body is any connecting configuration of the flow impingement body which is connected or connectable to the vehicle body by means of the displacement guidance system and/or by means of the displacement drive system.

The flow impingement body serves in principle, in the active position, to improve flow conditions at a wheel of a vehicle. Care should nevertheless also be taken that in its inactive position, the flow impingement body presents no, or at least a minimal, risk of collision with obstacles close to the ground.

According to a fourth aspect of the present Application which can be implemented in addition or alternatively to one or more of the aforementioned first three aspects of the present Application, a wheel spoiler apparatus of the kind recited initially is further improved by the fact that a bottom surface—facing, in the operationally ready state, toward a roadway surface on which the vehicle carrying the wheel spoiler apparatus is standing—of the flow impingement body, in the latter's inactive position, closes off an opening of a frame surrounding the flow impingement body, in particular of a part of an underbody liner, through which it is extendable into the active position. The remarks made above in the present Application apply regarding the frame. Preferably the bottom surface of the flow impingement body, in its inactive position, is flush with a frame segment that surrounds the flow impingement body in the inactive position, so that with the exception of a gap formed between the frame and flow impingement body, the frame segment and bottom surface form a substantially uniform lower boundary surface of the vehicle carrying the wheel spoiler apparatus.

To further improve flow conditions at the vehicle wheel when the flow impingement body is extended, the flow impingement body can have a flow separation edge on at least one of its lateral edge regions. The flow separation edge preferably extends parallel to the displacement path along which the flow impingement body is displaceable between an active and inactive position, or can at least have its largest of three mutually orthogonal extent components parallel to the displacement path. In principle, the separation edge can extend substantially orthogonally to the flow impingement direction, or substantially along the flow impingement direction. In the coordinate system used here, one component always extends parallel to the displacement path.

If the flow impingement body comprises a partition on its rear side, opposite from the flow impingement surface, which is usually directed toward the wheel associated with the flow impingement body, the flow separation edge is prolonged out beyond that rear wall of the flow impingement body which faces in the flow impingement direction.

It is the case for all the flow impingement bodies discussed in the present Application that the rear wall, facing in the flow impingement direction and opposite from the flow impingement surface, of the flow impingement body can comprise cutouts in order to enable a certain deformability of the flow impingement body during operation thereof. This deformability can further improve the effectiveness of the flow impingement body in terms of a positive influence on the flow conditions at the wheel associated with it. The deformability can be brought about by the reaction forces at the flow impingement body which occur during operation. The advantages of an active and a passive wheel spoiler apparatus can thereby be combined.

According to a refinement of the present invention, it is conceivable that the flow impingement body in its passive position is not completely retracted into its frame or into a vehicle underbody, but in that inactive position still projects into the impinging wind blast but not as far as in the active position. The flow impingement body can then, in the inactive position, still serve as a kind of static or passive wheel spoiler at lower driving speeds and flow impingement speeds. In order to avoid damage in the context of collisions with speed bumps and the like, that segment of the flow impingement body which still projects into the impinging wind blast in the inactive position is made at least partly, or in fact entirely, of the aforementioned material having a lower modulus of elasticity and/or less hardness.

In order to influence the flow conditions at the wheel associated with the flow impingement body, the flow impingement body can have a flow impingement surface, facing against the flow impingement direction, which is convex when viewed in the flow impingement direction. The flow impingement surface is preferably a flow impingement surface curved around one axis of curvature or around two mutually orthogonal axes of curvature. The flow impingement surface curved around only one axis of curvature can be polyhedral. A parabolic or hyperbolic flow impingement surface is also conceivable. In such cases the flow impingement body is embodied in such a way that in its active position relative to the vehicle body carrying it, the flow impingement surface exhibits at least over a segment along the displacement path of the flow impingement body, preferably over its entire maximum protrusion dimension, a parabolic or hyperbolic cross-sectional profile when viewing a cross section orthogonal to the displacement path. Because of its curvature around only one axis of curvature, the polyhedral, parabolic, or hyperbolic flow impingement surface can be manufactured by extrusion, the extrusion direction then being directed along the axis of curvature.

The flow impingement body, which can comprise ribs for stiffening on the rear side, not impinged upon by flow, of the partition carrying the flow impingement surface, is to be assessed in terms of its parabolic or hyperbolic cross-sectional shape exclusively on the basis of the cross-sectional shape of the external surface (flow impingement surface) of the flow impingement body upon which flow in fact impinges.

The polyhedral flow impingement surface is also preferably embodied in such a way that partial surfaces of the polyhedral flow impingement surface which are arranged at angles to one another are oriented parallel to the displacement path, directly adjacent partial surfaces of a polyhedral flow impingement surface preferably being connected to one another by a rounded connection region. Sharp-edged transitions between individual partial surfaces are also conceivable, but are not preferred in light of fluid-dynamic considerations.

The present Application also relates to a vehicle having a wheel spoiler apparatus as described above, the flow impingement body being arranged in front of a wheel of the vehicle in the flow impingement direction in a context of forward travel of the vehicle.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
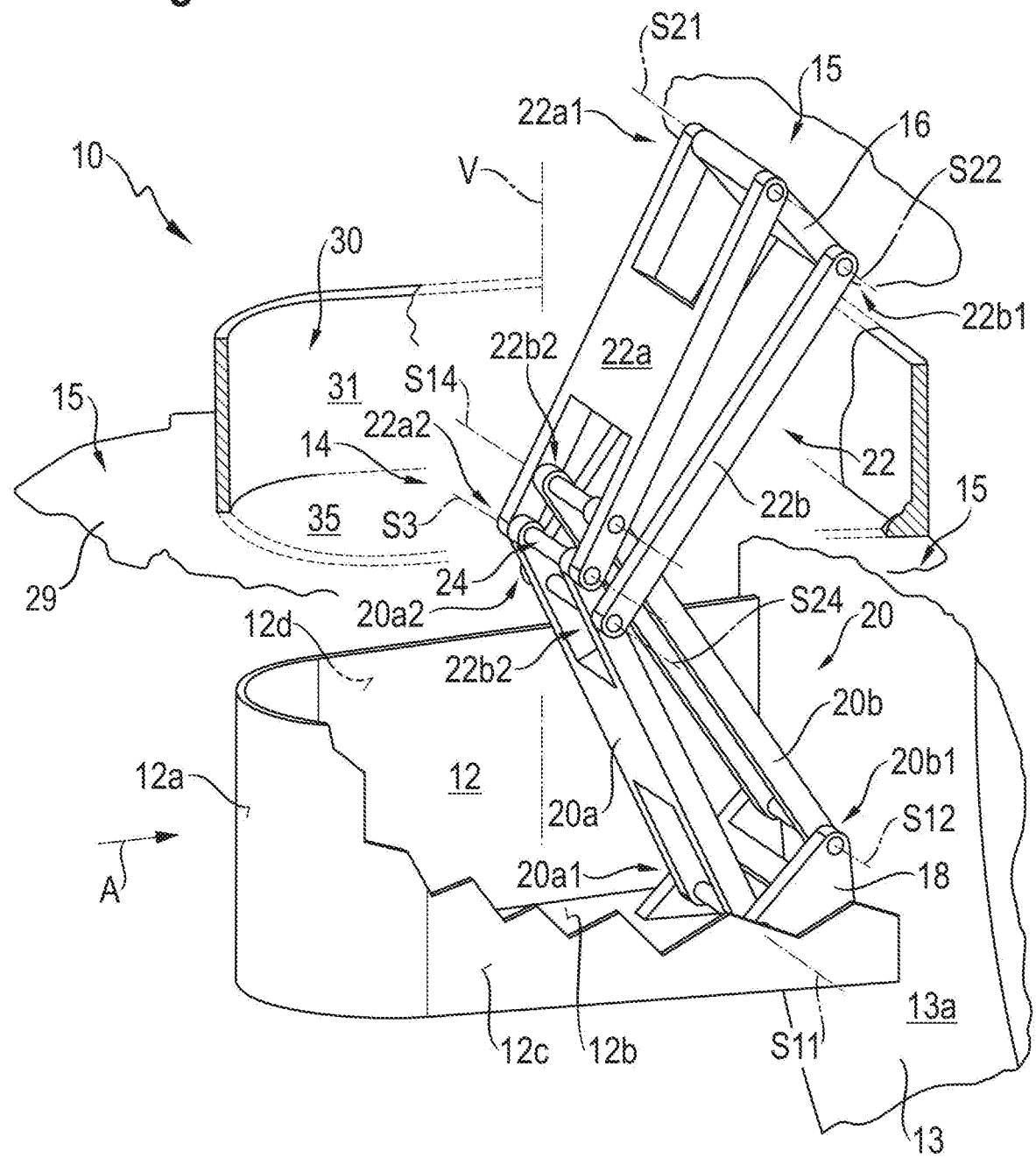
FIG. 1 is a perspective view of a first embodiment of a wheel spoiler apparatus of the present Application, with the flow impingement body in the active position.

Referring now to the drawings wherein the showings are for the purpose of illustrating preferred and alternative embodiments of the invention only and not for the purpose of limiting the same, FIG. 1 shows a first embodiment of a wheel spoiler apparatus of the present Application that is labeled in general as 10. Wheel spoiler apparatus 10 encompasses a flow impingement body 12 that, when wheel spoiler apparatus 10 is in operation, is impinged upon from a flow impingement direction A by air that strikes a flow impingement surface 12a, facing oppositely to flow impingement direction A, of flow impingement body 12. When wheel spoiler apparatus 10 is installed in operationally ready fashion on a vehicle, flow impingement surface 12a faces toward the front end of the vehicle. A wheel 13 of a vehicle 15 carrying apparatus 10, as a rule a front wheel 13, is located (in flow impingement direction A) behind flow impingement body 12 that is in the active position as depicted in FIG. 1.

Figure 2:
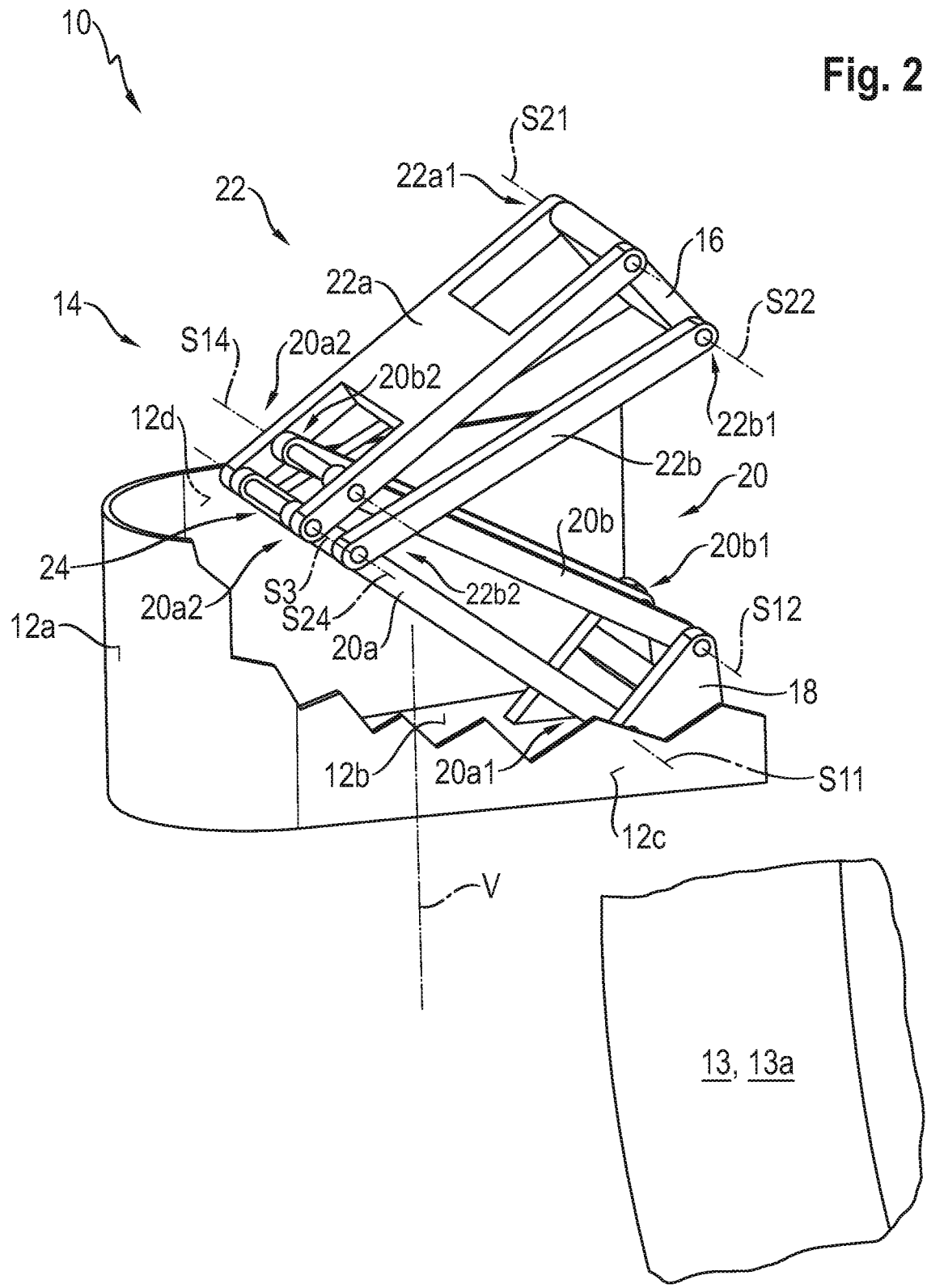
FIG. 2 is a perspective view of the first embodiment of FIG. 1, with the flow impingement body in the inactive position.

In the active position depicted in FIG. 1, flow impingement body 12 projects farther out of the remainder of the vehicle body, into the air flow flowing around the vehicle, than in the inactive position depicted in FIG. 2. It is located (in flow impingement direction A) in front of a running surface 13a of wheel 13.

Wheel spoiler apparatus 10 further encompasses a displacement guidance system 14 having a vehicle connection region 16 that is vehicle-mounted in the operationally ready state, and a flow impingement body connection region 18 that is embodied in one piece (alternatively, also in multiple pieces) with flow impingement body 12.

Displacement guidance system 14 of the first embodiment encompasses a first four-joint linkage 20 that is articulated on flow impingement body connection region 18 and is thus connected fixedly to flow impingement body 12. First four-joint linkage 20 is therefore also referred to as a "flow impingement body-side" four-joint linkage 20.

Second four-joint linkage 22 is articulated on vehicle connection region 16 and is thus fastenable or fastened, directly or indirectly by way of vehicle connection region 16, in vehicle-mounted fashion on vehicle 15 that carries apparatus 10.

Flow impingement body connection region 18 constitutes a base of first four-joint linkage 20. Vehicle connection region 16 constitutes a base of second four-joint linkage 22, which is also referred to as a "vehicle-side" four-joint linkage 22.

Flow impingement body-side four-joint linkage 20 comprises a first body-side link 20a and a second body-side link 20b, which are articulated at their respective base longitudinal ends 20a1 and 20b1 located closer to flow impingement body connection region 18, around mutually parallel pivot axes S11 and 12, on flow impingement body 12, more precisely on flow impingement body connection region 18 embodied thereon and connected in one piece thereto.

Vehicle-side four-joint linkage 22 likewise comprises two vehicle-side links 22a and 22b that are articulated at their respective longitudinal ends 22a1 and 22b1 located closer to vehicle connection region 16, on vehicle connection region 16 and pivotably relative thereto, around respective pivot axes S21 and S22 that are parallel both to one another and to pivot axes S11 and S12.

The two four-joint linkages 20 and 22 are coupled to one another via a common pivot joint 24. Common pivot joint 24 is constituted by the articulated support of link 20a of first four-joint linkage 20, and of link 22a of second four-joint linkage 22, at their respective longitudinal ends 20a2 and 22a2 remote from their respective base. At the location of common pivot joint 24, the aforesaid links 20a and 22a are connected to one another pivotably around a common pivot axis S3. Pivot axis S3 is parallel to pivot axes S11, S12, S21, and S22. Link 22a of second four-joint linkage 22 is that link of said linkage 22 which is located farther from the articulation points, on flow impingement body connection region 18, of base longitudinal ends 20a1 and 20b1 of links 20a and 20b of first four-joint linkage 20.

Link 20a is likewise that link of first four-joint linkage 20 which is located farther from base longitudinal ends 22a1 and 22b1 of links 22a and 22b of second four-joint linkage 22.

Second link 20b of first four-joint linkage 20 is likewise articulated, pivotably around a pivot axis S14, on link 22a of second four-joint linkage 22. Link 22a of second four-joint linkage 22 therefore constitutes a coupler of first four-joint linkage 20.

Link 22b is furthermore articulated at its coupler longitudinal end 22b2 opposite base longitudinal end 22b1, pivotably around a pivot axis S24, on link 20a of first four-joint linkage 20.

Common pivot axis S3 therefore constitutes both pivot axis S13 at coupler longitudinal end 20a2 of link 20a of the first four-joint linkage and pivot axis S23 at coupler longitudinal end 22a2 of link 22a of second four-joint linkage 22. Pivot axes S13 and S23 that exist in accordance with the remaining nomenclature of the mutually parallel pivot axes of four-joint linkage 20 and 22 thus coincide in axis S3. Not only does link 22a constitute a coupler of first four-joint linkage 20, but link 20a also constitutes a coupler of second four-joint linkage 22.

As a result of the above-described physical and kinematic coupling of the two four-joint linkages 20 and 22, flow impingement body 12 can be displaced linearly or almost linearly along a displacement path V, extending substantially in a straight line, between its active position shown in FIG. 1 and the inactive position shown in FIG. 2.

An advantage of this type of linear or quasi-linear guidance of flow impingement body 12 relative to the vehicle-mounted vehicle connection region 16 is that a portion of displacement guidance system 14 can be shielded by bottom surface 12b of flow impingement body 12 with respect to the roadway surface of a roadway being traveled by the vehicle that carries wheel spoiler apparatus 10, and displacement guidance system 14 can be shielded from external effects, in flow impingement direction A or in directions of action orthogonal to displacement path V, by flow impingement surface 12a and by side surfaces 12c and 12d adjacent thereto.

The rear side, opposite from flow impingement surface 12a with respect to displacement path V along flow impingement direction A, is open in the exemplifying embodiment depicted. It is possible to provide here, however, a rear wall that entirely or partly closes off the longitudinal ends, located remotely from flow impingement surface 12a, of side surfaces 12c and 12d of flow impingement body that is embodied as a shell body.

As is merely indicated in FIG. 1 in the interest of better clarity, vehicle 15 comprises an underbody 29 that, together with a skirt-like configuration, constitutes a frame 30 of wheel spoiler apparatus 10. Skirt-like configuration 31—or simply "skirt" 31—surrounds an opening 35 in frame 30 through which flow impingement body 12 can be extended from and retracted into frame 30 along a displacement path V defined by displacement guidance system 14.

Wheel 13 and frame 30 are shown only occasionally in the Figures that follow, in order to keep the Figures clear and to allow the aspects of the present invention to be focused on. The axes of the wheels that interact with flow impingement body 12 are always substantially orthogonal to flow impingement direction A and substantially orthogonal to displacement path V.

In FIG. 2, flow impingement body 12 is depicted in its inactive position. From the relative locations of the base-side pivot axes S11, S12, S21, and S22 it is apparent that the movement of the flow impingement body from the active position shown in FIG. 1 into the inactive position shown in FIG. 2 has occurred substantially along the straight-line displacement path V.

In principle, one of links 20a, 20b, 22a, and 22b can be driven to move by a rotational displacement drive system. In the present case, however, the driving of flow impingement body 12 to move between its operating positions (active position and inactive position) is achieved differently, as will be explained below with reference to FIGS. 8 to 10.

Figure 3:
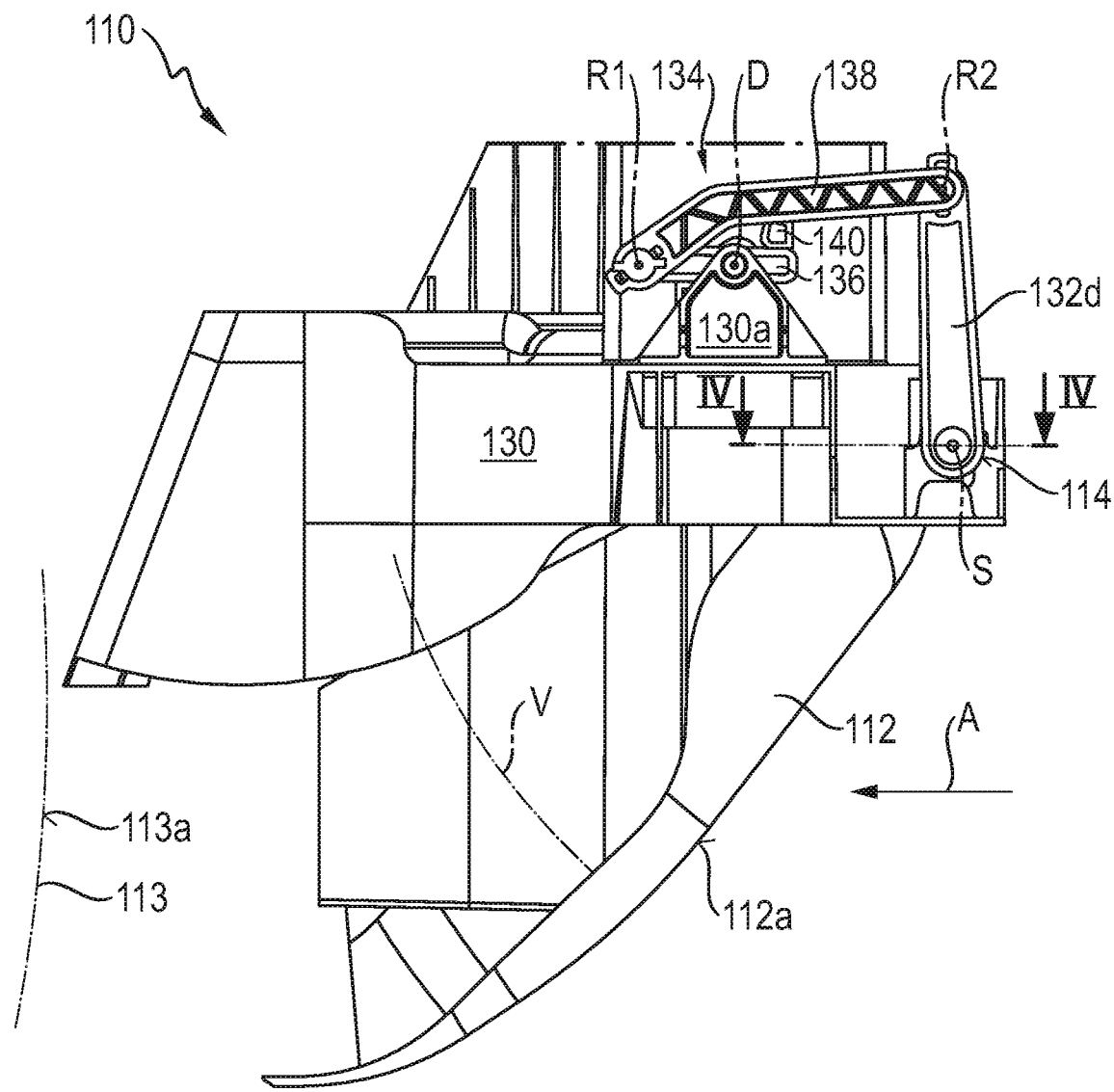
FIG. 3 is a side view of a second embodiment of a wheel spoiler apparatus of the present Application.

FIG. 3 is a side view of a second embodiment of a wheel spoiler apparatus of the present Application.

Components or component segments that are identical and functionally identical to those in the first embodiment are labeled in the second embodiment with the same reference characters but incremented by 100.

The second embodiment will be described below only insofar as it differs from the first embodiment, to the description of which reference is otherwise expressly made for explanation of the second embodiment.

Wheel spoiler 110 of the second embodiment also encompasses a vehicle-mounted frame 130 on which a shell-shaped flow impingement body 112 is articulated pivotably around a pivot axis S. FIG. 3 shows the shell-shaped flow impingement body 112 in its active position.

In contrast to flow impingement surface 12a of the first embodiment, which is curved only around an axis of curvature parallel to displacement path V of the first embodiment, flow impingement surface 112a of flow impingement body 112 is curved around at least two mutually orthogonal axes of curvature.

Figure 4:
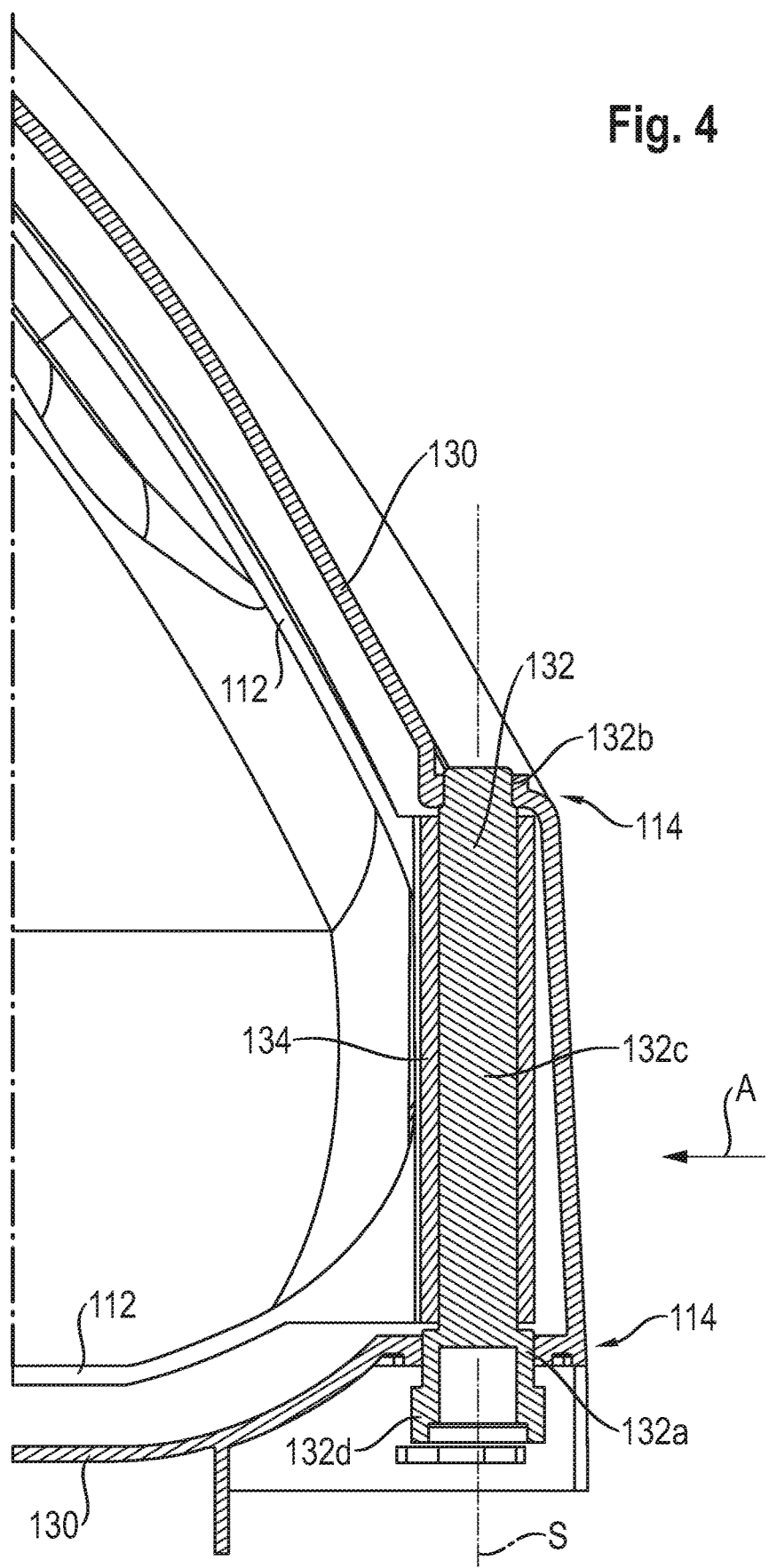
FIG. 4 is a partial section view, along section plane IV-IV of FIG. 3, of the second embodiment of FIG. 3.
Figure 5:
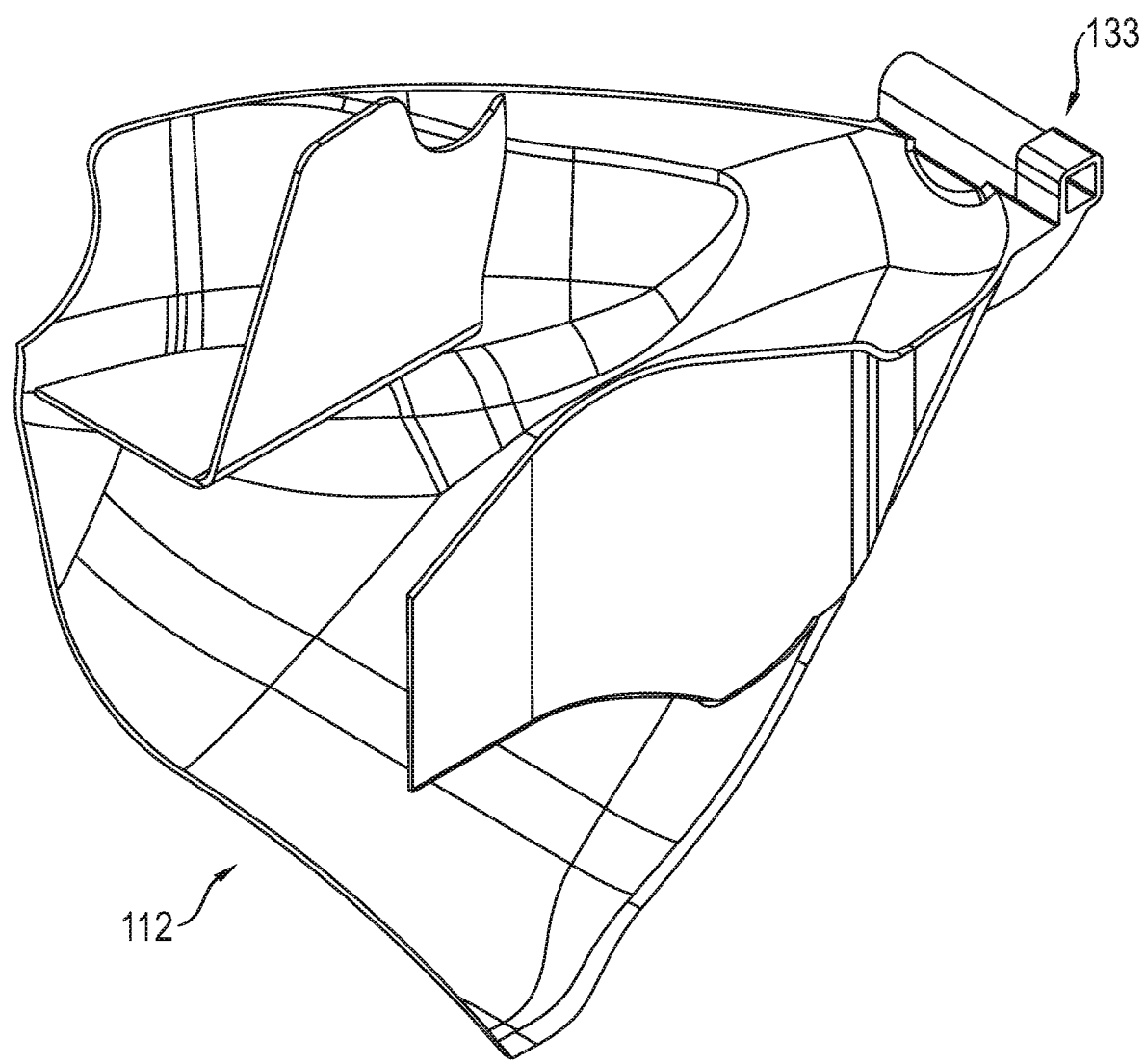
FIG. 5 is a perspective view of the flow impingement body of the wheel spoiler apparatus of the second embodiment, viewed from obliquely above and behind.

As shown by the partial section view of FIG. 4, flow impingement body 112 is supported, at its longitudinal end that is at the front oppositely to flow impingement direction A during operation, rotatably on frame 130 by way of a bolt 132. Bolt 132 comprises for that purpose two cylindrical or conical bearing segments 132a and 132b, provided at a distance from one another along pivot axis S, which are surrounded by a negatively cylindrical or negatively conical bearing counter-surface of frame 132 and, together with frame 130, constitute a plain bearing. The cylindrical or conical bearing segments 132a and 132b of bolt 132 have different diameters, so that bolt 132 is introducible along pivot axis S axially into frame 130 and can be brought into its final bearing position shown in FIG. 4. In the present case, bearing point 132a has a larger diameter than the axially remotely located bearing point 132b.

Between the two bearing segments 132a and 132b, bolt 132 has a shape that is not rotationally symmetrical, so that in that region 132c it can transfer a torque to a component surrounding it in segment 132c. In the present case, bolt 132 is embodied in segment 132c, by way of example, as a square-section bolt. In this segment 132c, flow impingement body 112 surrounds bolt 132 with a connecting sleeve 133 embodied with a negative square section.

Bolt 132 can be retained in a manner known per se against being pulled axially out of frame 130 along pivot axis S, for example by attachment, at that longitudinal end of bolt 132 which is located closer to bearing segment 132b, of a rear engagement configuration that engages behind the recess of frame 130 at bearing segment 132b.

At its end facing toward the viewer in FIG. 3, bolt 132 comprises an actuation segment 132d that stands out orthogonally from bolt 132 and thus forms an actuation lever of bolt 132.

Actuation segment 132d is articulatedly coupled, at its longitudinal end remote from bolt 132, to a toggle lever mechanism 134 that is part of the displacement drive system of wheel spoiler apparatus 110.

Toggle lever 134 comprises a first toggle lever 136 and a second toggle lever 138 coupled articulatedly thereto.

First toggle lever 136 is articulated, rotatably around a drive pivot axis D, on a bearing block segment 130a of frame 130.

At a distance from drive rotation axis D at one longitudinal end thereof, first toggle lever 136 is connected, rotatably around a rotation axis R1, to second toggle lever 138, which in turn is rotatably connected at its oppositely located longitudinal end, rotatably around a second rotation axis R2, to that longitudinal end of actuation segment 132d which is located remotely from bolt 132. Drive rotation axis D, rotation axes R1 and R2, and pivot axis S are parallel to one another.

Figure 6:
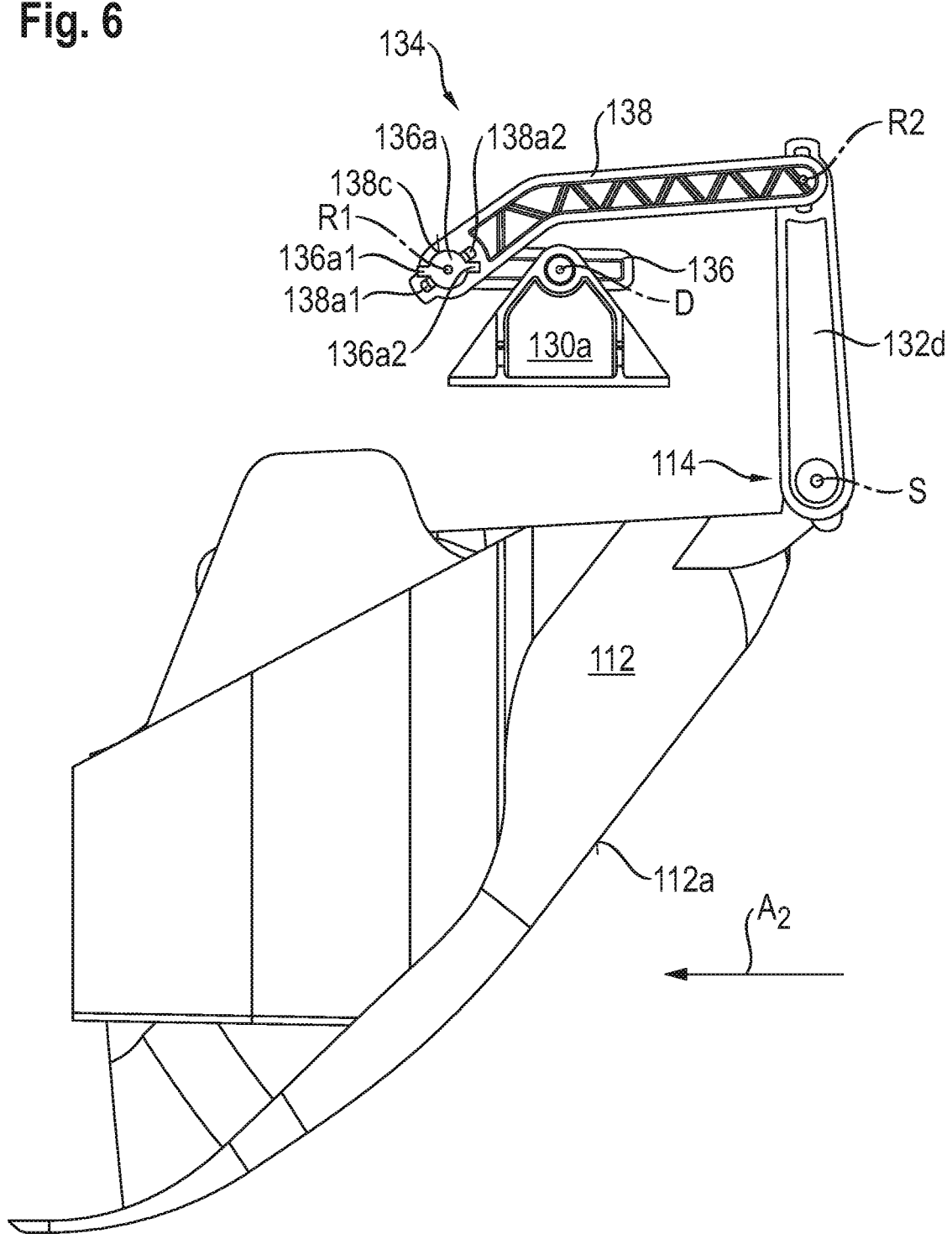
FIG. 6 is a side view of the wheel spoiler apparatus of the second embodiment, similar to that of FIG. 3 but with the frame only partly depicted and with the flow impingement body in the active position.

In FIG. 6, flow impingement body 112 is again depicted along with toggle lever mechanism 134 in the inactive position shown in FIG. 3, but with frame 130 mostly omitted. Only bearing block segment 130a of frame 130 is depicted.

As is evident from FIG. 3, when flow impingement body 112 is in the active position shown in FIGS. 3 and 6, an end segment of first toggle lever 136 which projects beyond drive rotation axis D proceeding from rotation axis R1 abuts against a frame-mounted stop 140. The abutting engagement between first toggle lever 136 and frame-mounted stop 140 completely defines the location of flow impingement body 112 in the active position, and in fact allows a rotation actuator, which is coupled to first toggle lever 136 and constitutes a drive motor of flow impingement body 112, to be switched off.

Figure 7:
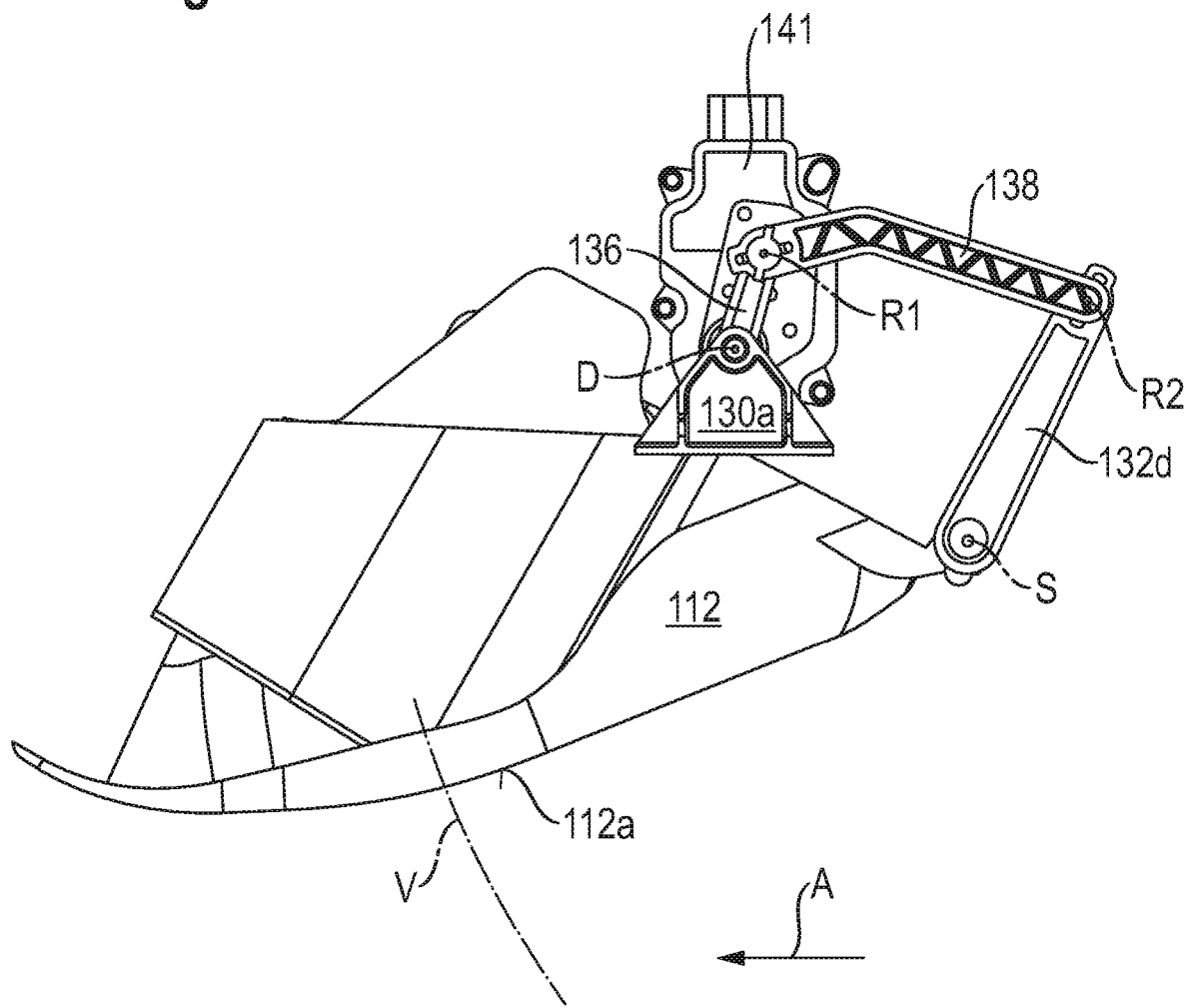
FIG. 7 shows the wheel spoiler apparatus of the second embodiment with the frame and displacement drive system only partly depicted and with the flow impingement body in the inactive position.

Proceeding from the position shown in FIGS. 3 and 6, first toggle lever 136 can be driven only clockwise around drive rotation axis D, and thereby pivot the flow impingement body into the inactive position shown in FIG. 7. Also depicted in FIG. 7 is an electric motor 141, for example a brushless DC motor or a stepping motor, constituting a rotational drive motor for first toggle lever limb 136. Flow impingement body 112 therefore moves between the active position and inactive position along a circular displacement path V whose center point is pivot axis S. In the inactive position, flow impingement surface 112a therefore closes off an opening in frame 130 through which flow impingement body 112 is pivotable out of and into frame 130.

Bearing segments 132a and 132b, together with the recesses of frame 130 which receive bearing segments 132a and 132b, constitute the displacement guidance system of flow impingement body 112 of the second embodiment.

As is evident from FIGS. 3, 6, and 7, toggle levers 136 and 138 are connected to one another merely by insertion, and second toggle lever 138 is similarly connected to actuation segment 132d of bolt 132 by insertion. This will be explained with reference to FIG. 6, using the example of the articulated connection of the first and second toggle levers 136, 138. Provided on first toggle lever 136 is a first axial projection 136a that stands out from first toggle lever 136 orthogonally to the drawing plane. Embodied on this axial projection 136a at two points located diametrically opposite one another are respective radial retaining projections 136a1 and 136a2 that stand out from axial projection 136a radially with reference to rotation axis R1.

Projections 136a1 and 136a2 can be inserted through recesses 138a1 and 138a2 in second toggle lever 138 when the two toggle levers 136 and 138 are in a second relative pivot position around rotation axis R1 relative to one another, and when projections 136a1 and 136a2 align with recesses 138a1 and 138a2 associated with them. Located between recesses 138a1 and 138a2 is a partially cylindrical recess, complementary to axial projection 136a, through which axial projection 136a can be inserted with its cylindrical body segment. The second relative pivot position or second relative pivot position region cannot be arrived at by toggle levers 136 and 138 during operation. This means that the articulated connection between toggle levers 136 and 138 is established before final assembly, toggle levers 136 and 138 being located, during operation thereof as intended, in a first relative pivot angle region, with respect to rotation axis R1, whose respective end positions are depicted in FIGS. 6 and 7. In this first relative pivot angle region, projections 136a1 and 136a2 engage behind an end surface 138c of second toggle lever 138 which extends on either side of the partly cylindrical recess, in a circumferential direction around rotation axis R1, between the two recesses 138a1 and 138a2. The result is to create, by way of projections 136a1 and 136a2 as well as end surface 138c, a positive engagement between toggle levers 136 and 138 which inhibits axial release of the two toggle levers 136 and 138 from one another. The same is true of the connection between second toggle lever 138 and actuation segment 132d.

Figure 8:
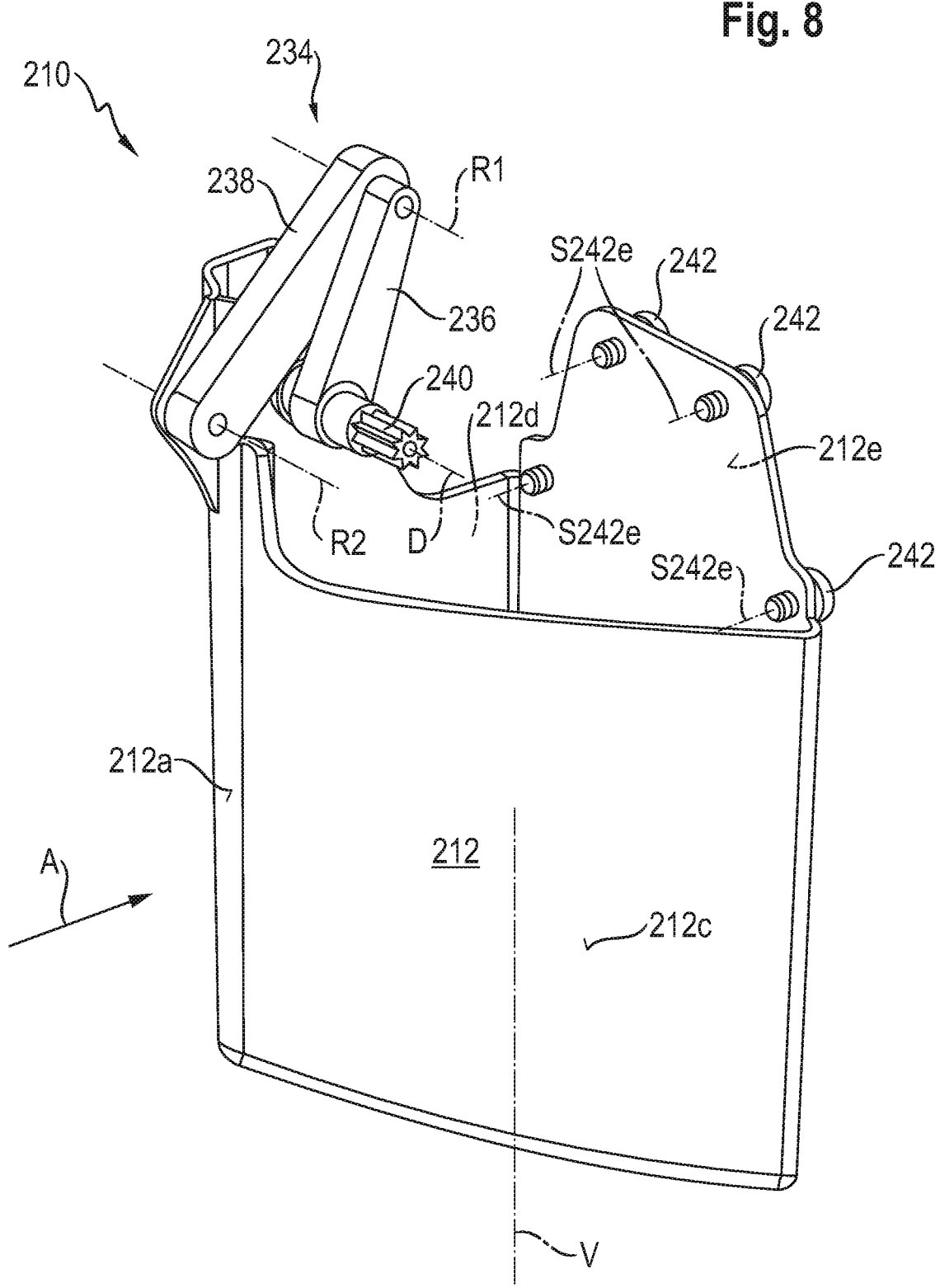
FIG. 8 shows a flow impingement body of a third embodiment of a wheel spoiler apparatus of the present Application along with a toggle lever mechanism belonging to the displacement drive system, the flow impingement body being in the inactive position.
Figure 9:
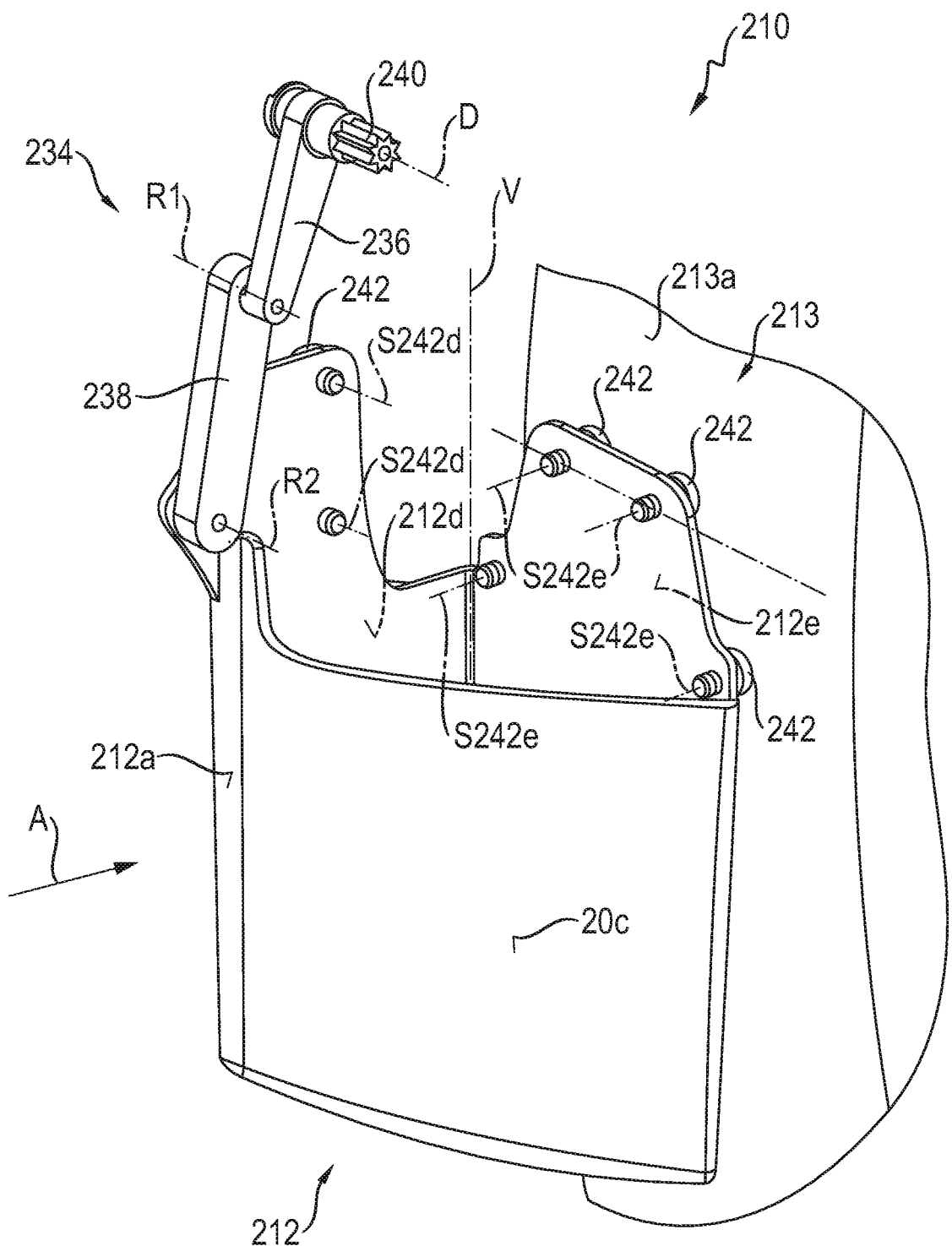
FIG. 9 shows the flow impingement body having a toggle lever mechanism of FIG. 8 in the active position.

FIG. 8 is a perspective depiction of a third embodiment of a flow impingement body 212 of the present Application. The same flow impingement body that is depicted in FIG. 8 in its inactive position is shown in FIG. 9 in its active position.

Components or component segments that are identical and functionally identical to those in the first and the second embodiment are labeled in the third embodiment with the same reference characters but incremented by 200 with respect to the first embodiment and by 100 with respect to the second embodiment.

The third embodiment will be described below only insofar as it differs from the first two embodiments, to the description of which reference is otherwise expressly made for explanation of the third embodiment.

In contrast to the flow impingement bodies of the first two embodiments, flow impingement body 212 of the third embodiment comprises a rear wall 212e on its rear side located oppositely from flow impingement surface 212a in flow impingement direction A, so that flow impingement body 212 has a cup-like shape, with bottom 212b (visible only in FIG. 11) and the enveloping surface constituted by surfaces 212a, 212c, 212d, and 212e, which is manufacturable by extrusion because its shape is curved in only one axis.

Flow impingement body 212 is driven to move along displacement path V, between its inactive position shown in FIG. 8 and the active position shown in FIG. 9, with the participation of a toggle lever mechanism 234. Toggle lever mechanism 234 comprises, at that longitudinal end of first toggle lever 236 which is rotatable around drive rotation axis D, a wedge profile configuration 240 or a similar positively engaging configuration suitable for transferring torque around drive rotation axis D, to which configuration an output shaft of a rotational drive system, for example a brushless DC motor, can be coupled in torque-transferring fashion.

Flow impingement body 212 can be guided along its displacement path V by two coupled four-joint linkages that have been explained in conjunction with FIGS. 1 and 2.

Figure 10:
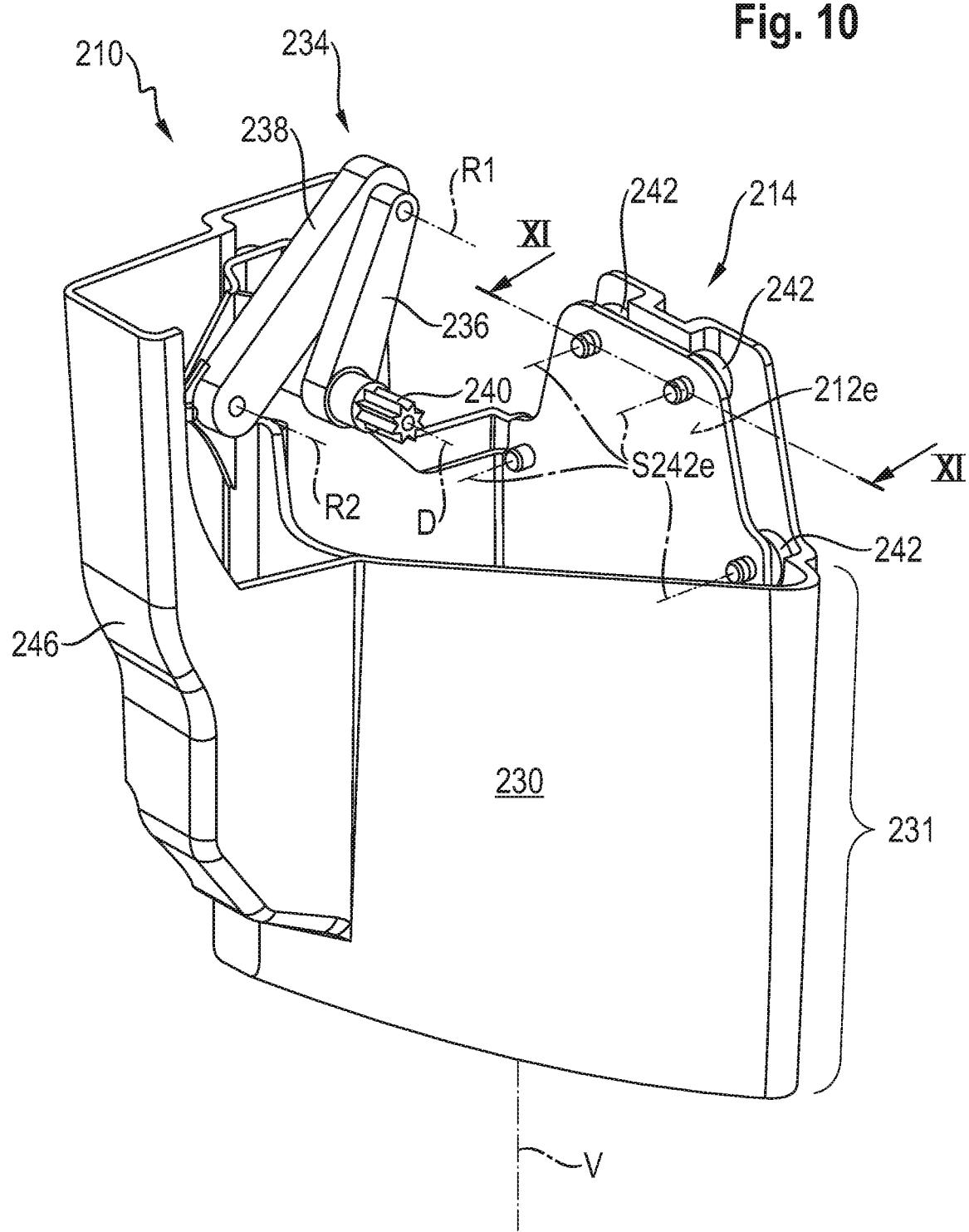
FIG. 10 shows the wheel spoiler apparatus of the third embodiment of the present Application, with the flow impingement body in the inactive position and with a frame surrounding the flow impingement body.
Figure 11:
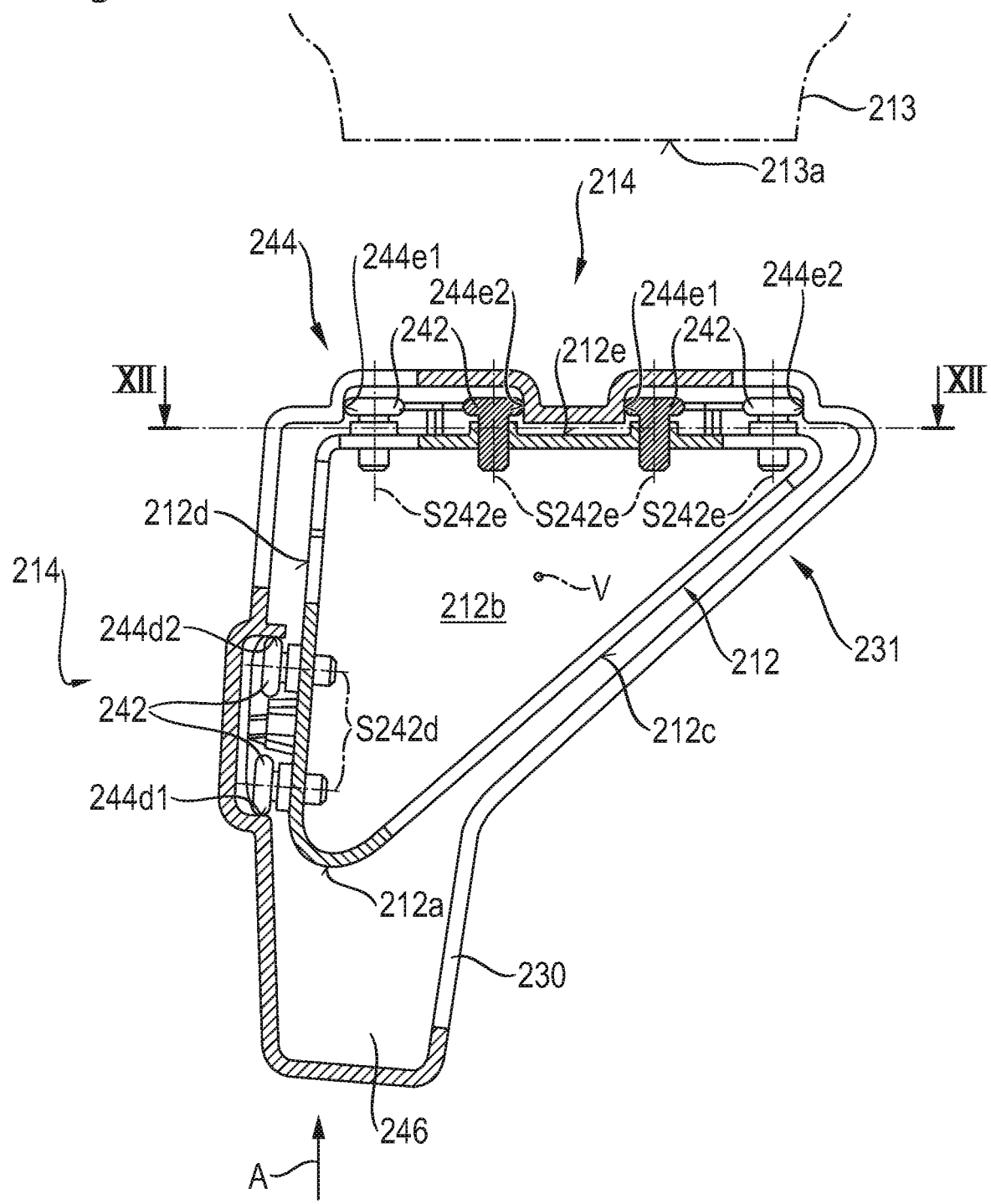
FIG. 11 is a sectioned depiction, in section plane XI-XI of FIG. 10, of the wheel spoiler apparatus of the third embodiment of FIG. 10.

Additionally or alternatively, flow impingement body 212 can be guided on frame 230 by rolling bodies in the form of rollers 242 (see FIGS. 10 and 11).

As shown by a comparison of FIGS. 8 and 9, toggle lever mechanism 234 is maximally folded up when flow impingement body 212 is in the inactive position, and is extended when flow impingement body 212 is in the active position. Thanks to this association of operating positions of flow impingement body 212 with extreme positions of toggle lever mechanism 234, a drive motor coupled to the toggle lever mechanism via positively engaging configuration 240 can be switched off, or does not need to be further energized, when the flow impingement body is in the active position or in the inactive position. The drive motor therefore does not need to expend power and energy in order to hold flow impingement body 212 in the active position or inactive position.

Rollers 242 are rotatable on side walls 212d and 212e (see FIGS. 9 and 11) around respective roller rotation axes S242d and S242e. All the rollers 242 associated with one side wall of flow impingement body 212 are arranged on flow impingement body 212 rotatably around respective mutually parallel rolling body rotation axes or roller rotation axes S242*d* and S242*e* that are substantially orthogonal to the side wall that carries them.

FIG. 10 shows flow impingement body 212 of the third embodiment with the vehicle-mounted frame 230 associated with it, which frame, in the inactive position shown in FIG. 10, surrounds it in a circumferential direction around displacement path V. A segment 231 of frame 230, surrounding flow impingement body 212 at a small gap distance, forms a skirt of frame 230.

Rollers 242 roll in a guidance track arrangement 244 extending along displacement path V.

Guidance track arrangement 244 encompasses several running surfaces 244*d*1 and 244*d*2, and 244*e*1 and 244*e*2. Guidance tracks designated with the same lower-case letters are associated with rollers 242 that are rotatably supported in that side wall of flow impingement body 212 which is labeled with the same lower-case letters. In the example depicted, running surfaces having the same lower-case letter and characterized by identical numbers face in the same direction. Running surfaces having the same lower-case letter and characterized by different numbers "1" and "2" face in opposite directions. The present arrangement of running surfaces and rolling bodies makes possible zero-clearance support of the flow impingement body in and oppositely to flow impingement direction A, and in and oppositely to a direction that is orthogonal both to flow impingement direction A and to displacement path V. This is because rolling-surface groups 244*di* on the one hand and 244*ei* on the other hand (where i=1, 2) face in mutually orthogonal directions.

Figure 12:
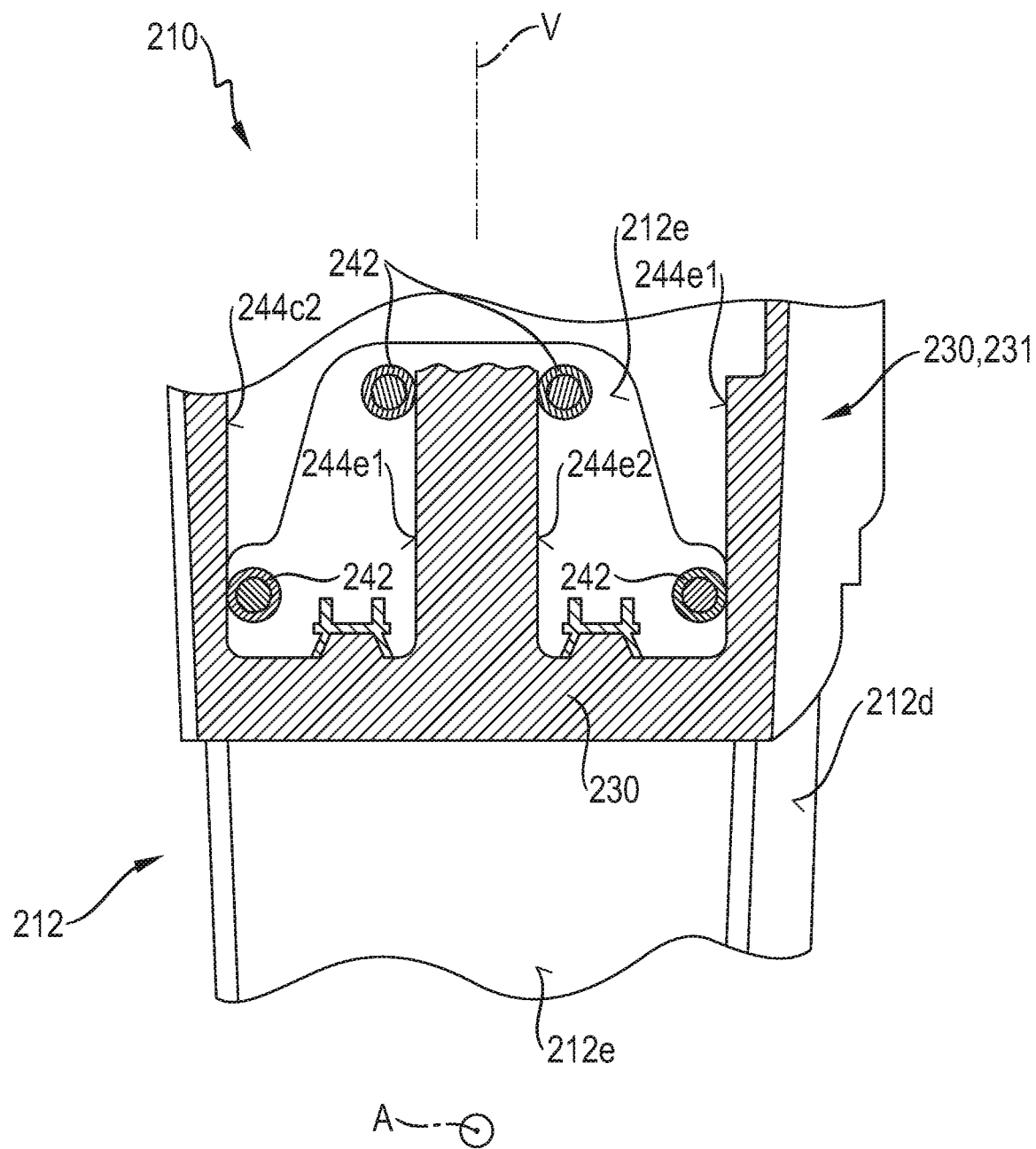
FIG. 12 is a section, along section plane XII-XII of FIG. 11, through the wheel spoiler apparatus of the third embodiment.

FIG. 12 is a section view along section plane XII-XII of FIG. 11, once again showing how rollers 242 on rear side 212*e* of flow impingement body 212 are offset pairwise along displacement path V in order also to secure flow impingement body 212, upon its displacement along the displacement path, against tilting around a tilt axis orthogonal to displacement path V and parallel to flow impingement direction A.

The association of guidance tracks and running surfaces, along with rollers, to the components constituted by the flow impingement body and frame can also be implemented differently from what is depicted in the Figures, so that frame 230 carries rolling bodies 242 and so that the running surfaces are embodied on flow impingement body 212.

As is evident from FIGS. 10 and 11, frame 230 comprises a protuberance 246 that gives toggle lever mechanism 234 sufficient space for movement but still surrounds it externally and thus protects it from external influences.

Figure 13:
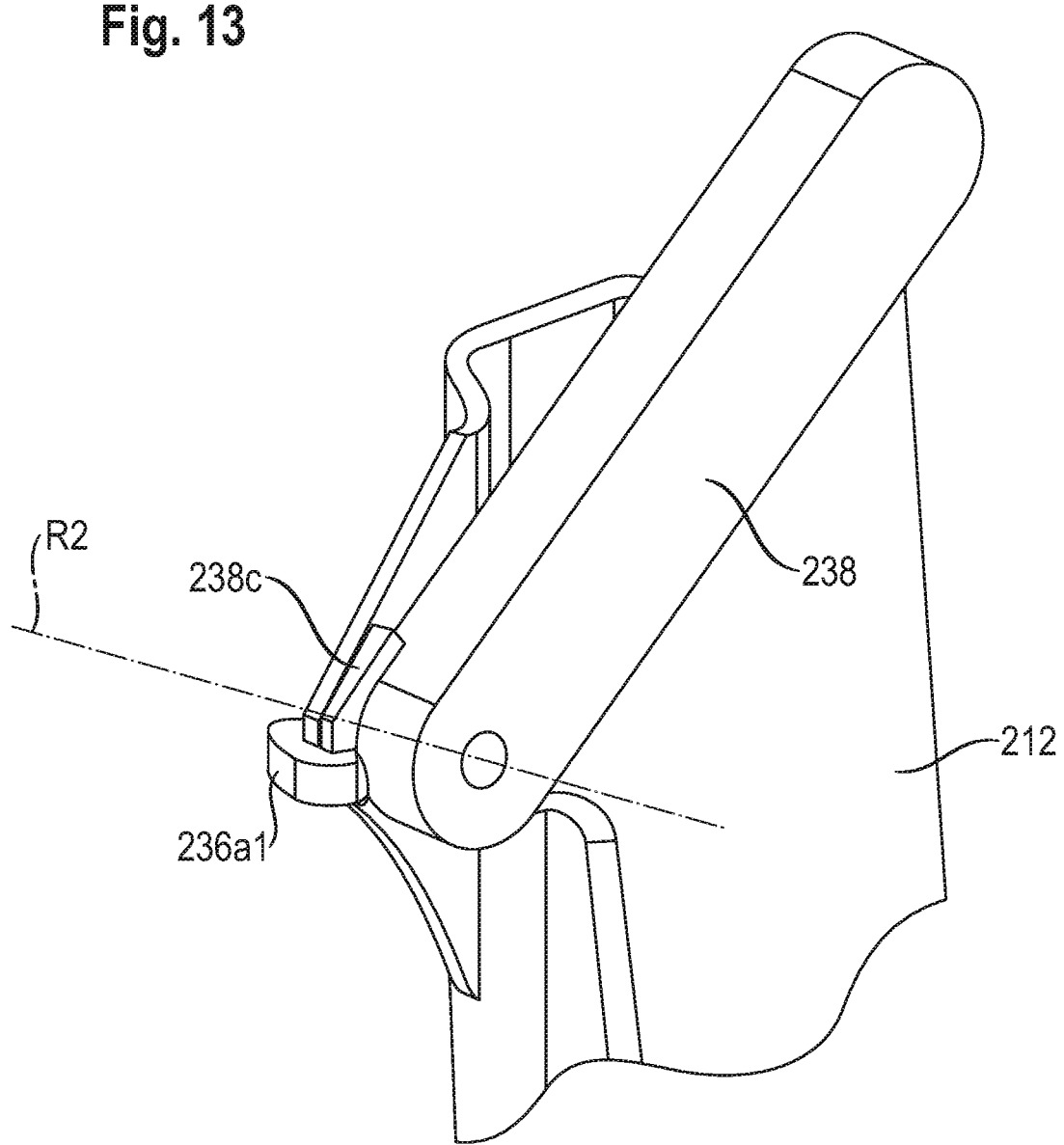
FIG. 13 is a detail view of the articulated attachment on the flow impingement body of the toggle lever located closer to the flow impingement body, with an axial release retainer provided between the flow impingement body and toggle lever.
Figure 14:
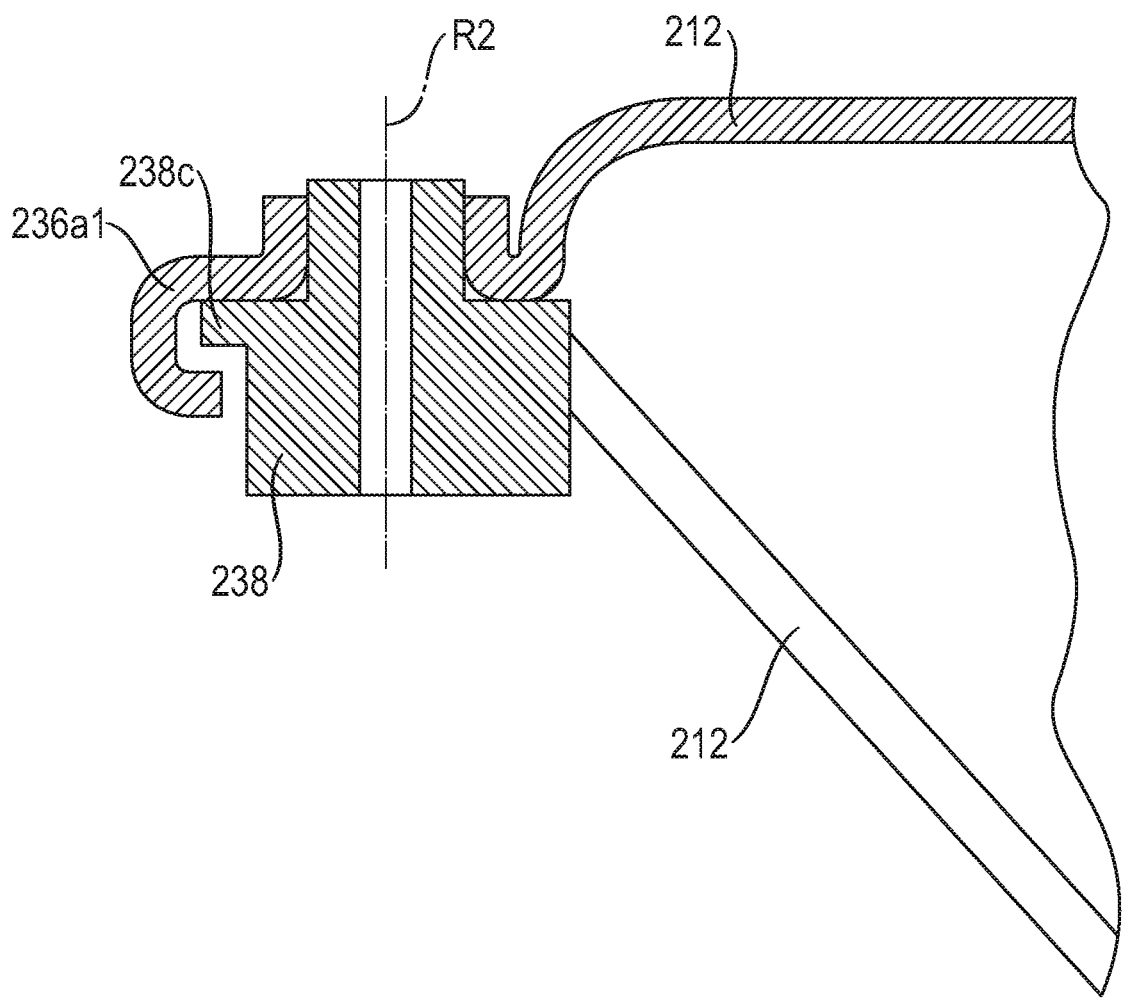
FIG. 14 is a section view through the detail view of FIG. 13, showing the retaining configuration and counterpart retaining configuration of the release retainer at the location of the articulated attachment of the toggle lever onto the flow impingement body.
Figure 15:
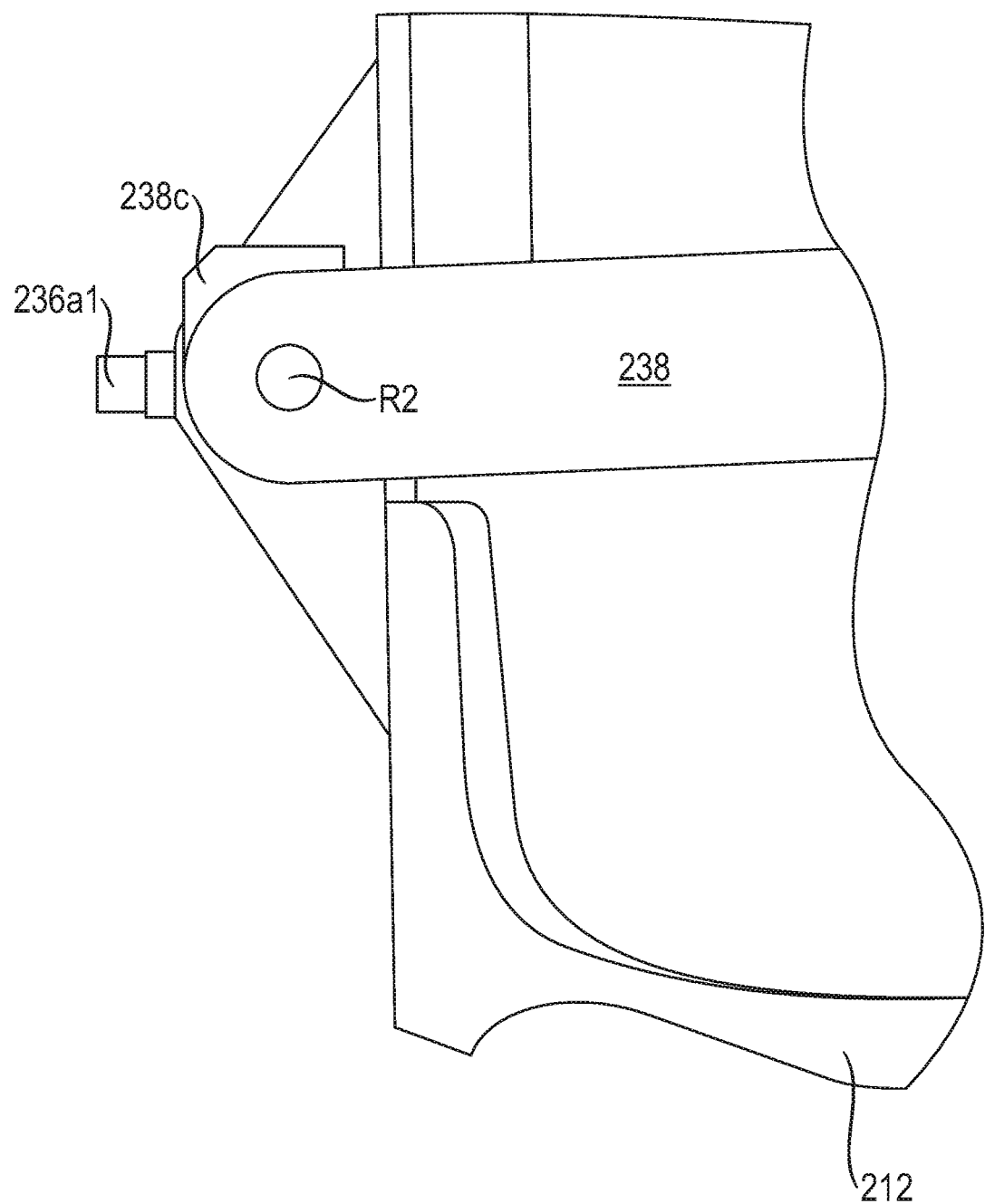
FIG. 15 is a side view of the detail assembly of FIG. 13, with the toggle lever and flow impingement body in the second relative pivot angle region in which the toggle lever pivot lever can be pulled axially off the flow impingement body in the absence of positive engagement between the retaining configuration and counterpart retaining configuration.

FIGS. 13 to 15 depict a further system for retaining components that are articulated rotatably on one another against axial release, this time using the example of second toggle lever 238.

Embodied on flow impingement body 212 in the region of the rotation joint of second toggle lever 238 around rotation axis R2 is a retaining configuration 236*a*1 that, in the position shown in FIGS. 13 and 14, engages positively around a radial projection 238*c*, embodied with reference to rotation axis R2 on second toggle lever 238, in the first relative pivot angle region, and thus prevents second toggle lever 238 from being axially pulled out as long as toggle lever 238 and flow impingement body 212 are in the first relative pivot angle region with reference to rotation axis R2.

The first relative pivot angle region preferably covers the entire range of operating positions of the participating components 238 and 212.

In FIG. 15, the components of FIG. 13 are depicted as viewed along rotation axis R2, specifically in a second relative pivot angle region in which a positive engagement no longer exists between projection 238*c* and retaining configuration 236*a*1 so that in that relative position, toggle lever 238 can be pulled axially off flow impingement body 212.

The relative position shown in FIG. 15 of components 238 and 212 in the second relative pivot angle region is usually not reached while flow impingement body 212 is being operated between the active and inactive positions, and is exclusively an assembly position.

FIG. 14 is a section through the rotary joint constituted between components 238 and 212, along a section plane that contains rotation axis R2 and retaining configuration 236*a*1.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A wheel spoiler apparatus encompassing a flow impingement body, a displacement drive system, and a displacement guidance system, the flow impingement body being displaceable between a retracted inactive position and an extended active position, the displacement guidance system comprising a vehicle connection region in which it is connectable to an associated vehicle body, and comprising a flow impingement body connection region in which it is connected to the flow impingement body, wherein the flow impingement body is constituted from at least two different materials that differ in terms of their modulus of elasticity and/or their hardness, wherein the displacement guidance system has two four-joint linkages coupled to one another via a common pivot joint, wherein the two four-joint linkages includes a first four-joint linkage that is a flow impingement body-side four-joint linkage having two body-side links that are respectively articulated on the flow impingement body at their one longitudinal ends constituting base longitudinal ends, the two four-joint linkages further includes a second four-joint linkage being a vehicle-side four-joint linkage having two vehicle-side links that are articulatable on the associated vehicle respectively at their longitudinal ends, constituting base longitudinal ends, facing toward the associated vehicle during operation, the body-side links being respectively articulated on a vehicle-side link at their coupler longitudinal ends opposite from the base longitudinal ends, and the vehicle-side links being respectively articulated on a body-side link at their coupler longitudinal ends opposite from the base longitudinal ends.

2. The wheel spoiler apparatus according to claim 1, wherein at least one flow impingement surface of the flow impingement body, which surface in the active position is exposed as intended to the impingement of wind blast, is constituted from a material having a lower modulus of elasticity and/or less hardness; and at least one connecting configuration that is embodied for indirect connection to the associated vehicle body is constituted from a material having a higher modulus of elasticity and/or greater hardness.

3. The wheel spoiler apparatus according to claim 1, wherein the two body-side links are each articulated at their coupler longitudinal ends on the same vehicle-side link.

4. The wheel spoiler apparatus according to claim 3, wherein the vehicle-side link on which both body-side links are articulated is the vehicle-side link which is located farther from articulation points of the base longitudinal ends of the body-side links.

5. The wheel spoiler apparatus according to claim 3, wherein the two vehicle-side links are each articulated at their coupler longitudinal ends on the same body-side link.

6. The wheel spoiler apparatus according to claim 5, wherein the body-side link on which both vehicle-side links are articulated is the body-side link which is located farther from articulation points of the base longitudinal ends of the vehicle-side links.

7. The wheel spoiler apparatus according to claim 1, wherein articulation points of the base longitudinal ends of the body-side links are shielded by the flow impingement body regardless of the operating position of the flow impingement body in a direction along the displacement path that the flow impingement body traverses upon its displacement between the inactive position and active position, and orthogonally to the displacement path.

8. The wheel spoiler apparatus according to claim 7, wherein at least when the flow impingement body is in the inactive position, the coupler longitudinal ends of both the body-side links and the vehicle-side links are shielded by the flow impingement body both along the displacement path and orthogonally to the displacement path.

9. The wheel spoiler apparatus according to claim 1 wherein a bottom surface of the flow impingement body, in the latter's inactive position, closes off an opening of a frame surrounding the flow impingement body, in particular of a part of an underbody liner, through which it is extendable into the active position.

10. The wheel spoiler apparatus according to claim 9, wherein the flow impingement body has a flow separation edge on at least one of its lateral edge regions, preferably at least one lateral edge region being prolonged, in a flow impingement direction, by a flow separation edge beyond a rear wall of the flow impingement body which faces in the flow impingement direction.

11. The wheel spoiler apparatus according to claim 9, wherein the flow impingement body comprises a flow impingement surface, facing against a flow impingement direction, which is convex when viewed in the flow impingement direction, in particular a flow impingement surface curved around only one axis of curvature or around two mutually orthogonal axes of curvature.

12. The wheel spoiler apparatus according to claim 9, wherein at least one flow impingement surface of the flow impingement body, which surface in the active position is exposed as intended to the impingement of wind blast, is constituted from a material having a lower modulus of elasticity and/or less hardness; and at least one connecting configuration that is embodied for indirect connection to the associated vehicle body is constituted from a material having a higher modulus of elasticity and/or greater hardness.

13. A vehicle having a wheel spoiler apparatus according to claim 1, the flow impingement body being arranged in front of a wheel of the vehicle in the flow impingement direction in a context of forward travel of the vehicle.

* * * * *